United States Patent
Rassool et al.

(10) Patent No.: US 7,043,473 B1
(45) Date of Patent: May 9, 2006

(54) MEDIA TRACKING SYSTEM AND METHOD

(75) Inventors: Reza Rassool, Stevenson Ranch, CA (US); William P. Worzel, Milan, MI (US); Brian Baker, Bellevue, WA (US)

(73) Assignee: Widevine Technologies, Inc., Seattle, WA (US)

( * ) Notice: Subject to any disclaimer, the term of this patent is extended or adjusted under 35 U.S.C. 154(b) by 425 days.

(21) Appl. No.: 09/988,824

(22) Filed: Nov. 20, 2001
(Under 37 CFR 1.47)

Related U.S. Application Data

(60) Provisional application No. 60/252,415, filed on Nov. 22, 2000.

(51) Int. Cl.
*G06F 7/00* (2006.01)

(52) U.S. Cl. .................. 707/6; 707/10; 707/104.1; 713/179

(58) Field of Classification Search ............. 707/104.1, 707/10, 6, 1, 2, 3; 713/150, 168, 176, 179–180
See application file for complete search history.

(56) References Cited

U.S. PATENT DOCUMENTS

| | | |
|---|---|---|
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,375,168 A | 12/1994 | Kudelski |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,701,469 A * | 12/1997 | Brandli et al. ............... 707/102 |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,878,134 A | 3/1999 | Handelman et al. |
| 5,883,957 A | 3/1999 | Moline et al. |
| 5,892,900 A | 4/1999 | Ginter et al. |
| 5,903,892 A * | 5/1999 | Hoffert et al. ............... 707/10 |

(Continued)

FOREIGN PATENT DOCUMENTS

EP      658054-BA      6/1995

(Continued)

OTHER PUBLICATIONS

"Detecting Digital Copyright Violations on the Internet" by Narayanan Shivakumar, Aug. 1999.

(Continued)

*Primary Examiner*—Safet Metjahic
*Assistant Examiner*—Brian Goddard
(74) *Attorney, Agent, or Firm*—Jamie L. Wiegand; Darby & Darby

(57) ABSTRACT

A method for identifying a media file transmitted over a network includes creating a plurality of known media file identifiers, each for a respective one of a plurality of known media files, using an identifier generating algorithm, storing the known media file identifiers in a database, creating a media file identifier for an unknown media file with the identifier generating algorithm and comparing the media file identifier for the unknown media file with known media file identifiers in order to produce an identification of the unknown media file.

46 Claims, 9 Drawing Sheets

U.S. PATENT DOCUMENTS

| | | | |
|---|---|---|---|
| 5,910,987 A | 6/1999 | Ginter et al. | |
| 5,915,019 A | 6/1999 | Ginter et al. | |
| 5,917,912 A | 6/1999 | Ginter et al. | |
| 5,920,625 A | 7/1999 | Davies | |
| 5,920,861 A | 7/1999 | Hall et al. | |
| 5,922,208 A | 7/1999 | Demmers | |
| 5,923,666 A | 7/1999 | Gledhill et al. | |
| 5,933,498 A | 8/1999 | Schneck et al. | |
| 5,939,975 A | 8/1999 | Tsuria et al. | |
| 5,943,422 A | 8/1999 | Van Wie et al. | |
| 5,949,876 A | 9/1999 | Ginter et al. | |
| 5,982,891 A | 11/1999 | Ginter et al. | |
| 6,009,116 A | 12/1999 | Bednarek et al. | |
| 6,009,401 A | 12/1999 | Horstmann | |
| 6,009,525 A | 12/1999 | Horstmann | |
| 6,021,197 A | 2/2000 | von Willich et al. | |
| 6,035,037 A | 3/2000 | Chaney | |
| 6,038,433 A | 3/2000 | Vegt | |
| 6,049,671 A | 4/2000 | Slivka et al. | |
| 6,055,503 A | 4/2000 | Horstmann | |
| 6,073,256 A | 6/2000 | Sesma | |
| 6,112,181 A | 8/2000 | Shear et al. | |
| 6,138,119 A | 10/2000 | Hall et al. | |
| 6,157,721 A | 12/2000 | Shear et al. | |
| 6,178,242 B1 | 1/2001 | Tsuria | |
| 6,185,683 B1 | 2/2001 | Ginter et al. | |
| 6,189,097 B1 | 2/2001 | Tycksen, Jr. et al. | |
| 6,191,782 B1 | 2/2001 | Mori et al. | |
| 6,199,081 B1 * | 3/2001 | Meyerzon et al. | 715/513 |
| 6,226,794 B1 | 5/2001 | Anderson, Jr. et al. | |
| 6,237,786 B1 | 5/2001 | Ginter et al. | |
| 6,240,185 B1 | 5/2001 | Van Wie et al. | |
| 6,247,950 B1 | 6/2001 | Hallam et al. | |
| 6,253,193 B1 | 6/2001 | Ginter et al. | |
| 6,256,668 B1 | 7/2001 | Slivka et al. | |
| 6,272,636 B1 | 8/2001 | Neville et al. | |
| 6,285,985 B1 | 9/2001 | Horstmann | |
| 6,292,569 B1 | 9/2001 | Shear et al. | |
| 6,298,441 B1 | 10/2001 | Handelman et al. | |
| 6,314,409 B1 | 11/2001 | Schneck et al. | |
| 6,314,572 B1 | 11/2001 | LaRocca et al. | |
| 6,334,213 B1 | 12/2001 | Li | |
| 6,349,296 B1 * | 2/2002 | Broder et al. | 707/3 |
| 6,363,488 B1 | 3/2002 | Ginter et al. | |
| 6,389,402 B1 | 5/2002 | Ginter et al. | |
| 6,401,118 B1 * | 6/2002 | Thomas | 709/224 |
| 6,405,369 B1 | 6/2002 | Tsuria | |
| 6,409,080 B1 | 6/2002 | Kawaglshi | |
| 6,409,089 B1 | 6/2002 | Eskicioglu | |
| 6,427,140 B1 | 7/2002 | Ginter et al. | |
| 6,449,367 B1 | 9/2002 | Van Wie et al. | |
| 6,449,719 B1 | 9/2002 | Baker | |
| 6,453,252 B1 * | 9/2002 | Laroche | 702/75 |
| 6,459,427 B1 | 10/2002 | Mao et al. | |
| 6,460,050 B1 * | 10/2002 | Pace et al. | 707/104.1 |
| 6,466,670 B1 | 10/2002 | Tsuria et al. | |
| 6,505,299 B1 | 1/2003 | Zeng et al. | |
| 6,618,484 B1 | 1/2003 | Van Wie et al. | |
| 6,547,829 B1 * | 4/2003 | Meyerzon et al. | 715/501.1 |
| 6,587,561 B1 | 7/2003 | Sered et al. | |
| 6,628,824 B1 * | 9/2003 | Belanger | 382/165 |
| 6,629,243 B1 | 9/2003 | Kleinman et al. | |
| 6,634,028 B1 | 10/2003 | Handelmann | |
| 6,640,304 B1 | 10/2003 | Ginter et al. | |
| 6,643,641 B1 * | 11/2003 | Snyder | 707/4 |
| 6,651,170 B1 | 11/2003 | Rix | |
| 6,654,420 B1 | 11/2003 | Snook | |
| 6,654,423 B1 | 11/2003 | Jeong et al. | |
| 6,658,403 B1 * | 12/2003 | Kuroda et al. | 707/2 |
| 6,658,568 B1 | 12/2003 | Ginter et al. | |
| 6,668,325 B1 | 12/2003 | Collberg et al. | |
| 6,675,174 B1 * | 1/2004 | Bolle et al. | 707/104.1 |
| 6,738,906 B1 * | 5/2004 | Hippelainen | 713/200 |
| 2002/0059251 A1 * | 5/2002 | Stern et al. | 707/10 |
| 2002/0087515 A1 * | 7/2002 | Swannack et al. | 707/2 |
| 2003/0007568 A1 | 1/2003 | Hamery et al. | |

FOREIGN PATENT DOCUMENTS

| | | |
|---|---|---|
| EP | 714204 B1 | 5/1996 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |

OTHER PUBLICATIONS http://www.ntt.co.jp/news/news02e/0209/020927.htm, Sep. 27, 2002.

Coverage and Generalization in an Artificial Immune System, Balthrop, et al., 2002.

Video Protection by Partial Content Corruption, C. Griwodz, Sep. 1998.

An Overview of Multimedia Content Protection in Consumer Electronics Devices, Eskicioglu et al.

Performance Study of a Selective Encryption Scheme for the Security of Networked, Real-Time Video, Spanos et al., 1995.

Goonatilake, Suran, ed. et al., Intelligent Systems for Finance and Business, 1995, chapter 2-10, pp. 31-173.

Irdeto Access and Optibase create Strategic Alliance—Dec. 14, 2000, http://www.irdetoaccess.com/press/0000041.htm.

System Security, Streaming Media, S. Blumenfeld, Oct. 2001.

http://www.cs.unm.edu/-forest/projects.html, Dec. 2, 2003.

Partial Encryption for Image and Video Communication, H. Cheng, 1998.

A Review of Video Streaming Over the Internet, Hunter et al., Dec. 2, 2003.

Standards Track, Schulzrinne, et al., Apr. 1998, pp. 1-86.

http://www.optibase.com/html/news/Dec.__14__2000.html, Dec. 14, 2004.

Omneon Video Networks Product Announcement, Broadband Streaming, pp. 1-4.

Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.

* cited by examiner

MEDIA TRACKING SYSTEM AND METHOD

The present application claims priority to U.S. provisional application of Rassool et al., Ser. No. 60/252,415, filed Nov. 22, 2000, the entirety of which is hereby incorporated into the present application by reference.

FIELD OF THE INVENTION

The present invention is directed to a media tracking system and method for searching machine readable data to locate media files and generate unique identifiers for the media files located by the tracking system.

BACKGROUND OF THE INVENTION

Modern technology has made possible the digital encoding of audio and image information. Examples of audio information that may be digitally encoded include music, speech and sound effects. Image information may be roughly divided into still images and moving images (hereafter "video"). Image information that may be digitally encoded includes photographs, paintings, trademarks, product logos, designs, drawings and so on. Video information that may be digitally encoded includes movies, news and entertainment television programming, home videos and the like. Audio and image information may be digitally encoded when initially recorded or may be initially recorded in an analog format and later converted to a digital format. Digital information is relatively easy to store, retrieve, manipulate, reproduce and distribute. Digitized information can, for example, be easily stored and accessed on a personal computer, and computers can be interconnected to one another for data transmission by a network. A network may interconnect, for example, computers located in a particular building or in a particular geographical area. The Internet is a well-known example of a worldwide computer network.

Computer networks such as the Internet may be conceptually thought of as a software interface that facilitates the storage of, the search for and the transfer of information on the Internet. The advent of the Internet has made possible the creation of a large number of linked commercial and non-commercial network presences, e.g., web-sites and cross-links maintained on host computers connected to the Internet. Each network presence may include, for example, digitized audio and image information (e.g., stored in "media files") and hypermedia-based documents that Internet users can readily access using a software program frequently referred to as a "browser". The Internet may be also be conceptually thought of as, in essence, a collection of linked databases distributed throughout the network that are accessible to all users (or some users, in the case of, for example, password protected network presences) of the network.

A large body of audio and image information is currently available on the Internet and this body of information is constantly changing as, for example, new network presences, e.g., web sites, come into the existence and as new files are added to the existing network presences. While the abundance of currently available audio and image information and the ease of duplicating and transmitting the same provide enormous potential benefits, this abundance also gives rise to several problems. For example, the usefulness on this information is limited because there is often no way to locate media files that have a particular media content. Furthermore, the ease of copying and distributing media files has also greatly exacerbated the problem of media piracy. There is, for example a growing level of piracy of copyright protected media files on the Internet. Copyrighted material and other proprietary material is being replicated and distributed over the Internet without permission, for both personal and commercial use.

Pirated media files stored on network presences can be downloaded as streaming media content for viewing and/or listening (i.e., "playing") in real-time or may be downloaded and stored on the computer of the person accessing the pirating network presence for playing and/or for further copying and redistribution at a later time. Nework presences offering pirated media may be commercial or non-commercial (sometimes called "free" sites). Recently, Internet services such as Napster™ and Gnutella™ have arisen that facilitate peer-to-peer protocols to enable transfer of copied media files between individual Internet users. Therefore, media content owners are increasingly concerned a piracy of their intellectual property over the Internet.

Moreover, managing and tracking the distribution of media files becomes increasingly difficult with the large number of mechanisms for disseminating the media and the increasing number of pathways that the dissemination may follow.

SUMMARY

Thus, there is a need for a media tracking system that can be used to search data, locate media files and identify their contents, particularly on the Internet. To meet this need, the present invention provides a media tracking system that may include a set of media identification software tools that can provide a wide range of media identification services for a wide range of purposes in many environments. The media identification tools provide the tracking system with the ability to analyze the content of media files and generate unique identifiers or "fingerprints" for identifying the file contents. The software tools included in the media tracking system can use these unique identifiers to perform a wide range of services. For example, the media tracking system can be used to catalog or index a database of media files or can be used to search for media files containing particular media content. This tracking system may be used to identify the source of media files, how they reached their present storage location and any associated pathways of dissemination.

The tracking system may also be used to "police" a collection of data to determine if unauthorized duplication of protected media files has occurred. This intellectual property protection service can be performed by the tracking system in many environments including, for example, a database stored on a single computer or on a network such as the Internet.

Various objects, features and advantages of the present invention will become apparent from the following detailed description, the accompanying drawings, and the appended claims.

DETAILED DESCRIPTION OF THE INVENTION

Figure 1:
FIG. 1 is a black and white reproduction of a full color digital image.

When a media tracking system designed in accordance with various embodiments of the invention is used to track intellectual property, e.g., to track dissemination of media for licensing royalties, to police copyright violations, etc., in the Internet environment, the tracking system can be used to generate a unique identifier for each media file to be protected by performing an identifier generating algorithm on the media contents of each media file to be tracked, e.g., for protection of the contents of that tracked media file. These known media file identifiers may be stored in a database. The media tracking system may provide a highly distributed robot or "crawler" that is adapted to search or "crawl" the Internet to locate network presences, e.g., network presences, that contain media files. Once these network presences are located, media files located on these network presences are analyzed to generate media file identifiers for the those media files. The media file identifiers of these unknown media files are checked against the known media file identifiers of the media files to be traced (hereafter "tracked media files") in the media tracking system database. The media tracking system may generate a report identifying the network presences storing specified media files. This information may be used to determine an amount of royalties owed by the network presence(s), track dissemination or police intellectual property rights. For example, supposing tracked media files are offered for playing and/or downloading on network presences without the permission of the media owner, the media tracking system can generate a report identifying the network presences and the media files stored there without permission.

In accordance with at least one embodiment of the invention, the need expressed above is met by a method for identifying a video or audio file resident on a network, the method comprising creating a plurality of known media file identifiers, each for a respective one of a plurality of known media files, using an identifier generating algorithm. Next, known media file identifiers are stored in a database. Subsequently, a media file identifier is created for an unknown media file with the identifier generating algorithm. Next, a comparison is performed between the media file identifier for the unknown media file with known media file identifiers in order to produce an identification of the unknown media file.

In accordance with at least one embodiment of the invention, the need expressed above is met by an apparatus for identifying a video or audio file resident on a network. The apparatus may include a module for creating a plurality of known media file identifiers, each for a respective one of a plurality of known media files, using an identifier generating algorithm. The apparatus may also include a database storing the known media file identifiers as well as a module for creating a media file identifier for an unknown media file with the identifier generating algorithm. Additionally, the apparatus may include a comparison module that compares the media file identifier for the unknown media file with known media file identifiers in order to produce an identification of the unknown media file.

Various embodiments of the invention are directed to a media tracking system that includes a set of media recognition utilities that can be used for identifying media content contained in media files. The ability of the media tracking systems designed in accordance with the embodiments of the invention to recognize media content within media files provides the tracking system with the ability to perform a wide range of tasks in a wide range of environments. This media identifying capability can be utilized, for example, to catalog and index media files in, for example, the environment of an individual computer or in a computer network environment, to locate media files that contain particular media content, or to police copyright violations of media files. The tracking system is discussed below in more detail in the context of a particular application in a particular environment (i.e., a tracking system for tracking dissemination of media) to illustrate one use of the media recognition capabilities of the system. It should be understood, however, that this description is merely meant as one illustration of potential utility and is not intended to limit the scope of the invention to tracking media rights in a particular environment.

The tracking system, when configured to track media files, utilizes a set of software tools that include an Internet crawler and a set of media recognition utilities. Media files, in the context of this description include data files in various formats that contain audio and/or image information. Audio files may be, for example, computer files that include computer code, which encodes audio information such as music, speech, sound effects and the like. Audio file formats currently popular and frequently encountered on the Internet include "wave" files (*.wav), MP3 files (*.mp3), liquid audio files (*.lqt), and Real Audio™ files (*.rm, *.ram). Image files include still images and "moving" images (hereafter referred to generally as "video"). Still images may include, for example, textual files, photographs, drawings, paintings, trademarks, logos, designs and so on. Video files may include, for example, computer files, which include computer code encoding a series of images that may be viewed in rapid succession to create the illusion of motion. Video file formats frequently encountered on the Internet include MPEG (*.mpg) files, QuickTime (*.qt) files, Vivo (*.viv) files and Real Video (*.rm). Some of these file formats (Real Audio™ and Real Video™, for example) can be downloaded as streaming audio and/or video that is played in real-time. Other file formats (for example, *.mp3) are typically downloaded in their entirety and stored locally for playing and/or for further redistribution at a future time after downloading. Such audio and video files are described in greater detail below.

Generally, each known media file to be tracked is analyzed by an identifier generating algorithm that forms part of the media recognition utilities of the tracking system. The identifier generating process results in the creation of a media file identifier for the particular known media file (which may be also be referred to as a "known" media file identifier). The media file identifiers of the known media files to be tracked may be stored in a database for later comparison with identifiers generated by the identifier generating algorithm from unknown media files to be analyzed.

The tracking system may further provide a highly distributed Internet robot or "crawler" that may be adapted to search or "crawl" the Internet to locate and search network presences that contain media files. Each unknown media file (meaning that the contents of the media file are unknown) discovered on a target network presence (theses files being referred to hereafter as a "target media file") by the crawler is then analyzed by the same identifier generating algorithm used to generate the known media file identifiers from the media content of the tracked media files. The unknown identifier of the target file may be checked against the known media file identifiers of the tracked media files in the database. If an unknown media file identifier of a target media file is identical to or sufficiently resembles the known media file identifier of a tracked media file, then a "match" may be said to have occurred between the two media file identifiers. If the media file identifiers of two files match, a conclusion may be made that the target media file contains tracked media content. If tracked media content is offered for playing or downloading on network presences that are not authorized by the media owner, the system may generate a report identifying the network presence and, e.g., listing the files stored there without permission, the files stored there with permission, the number of files stored with/ without permission. Moreover, the system may generate a report identifying network presences that offer the tracked media content, regardless of whether their possession of the content was authorized by the media content owner.

Various identifier generating algorithms may be used to generate media file identifiers. During the explanation of these algorithms, it should be appreciated that the terms "fingerprint", "media file identifier" and "identifier" are synonymous. Examples of the various algorithms used to generate media file identifiers are explained below. Subsequently, a detailed explanation of the various media tracking systems and methods is provided.

As a preliminary matter, it should be understood that all of the software described herein, including the file recognition software and the Internet crawler, can be encoded for execution on a general-purpose computer, specific purpose computer, or on a network of general and/or specific purpose computers. Generally, a media protection process designed in accordance with at least one embodiment of the invention may include various operations. For example, a database may be created, which contains one (or more) known media file identifiers for each known media file to be tracked. Additionally, one or more identifiers may be generated from the media content of a target file suspected of being an unauthorized duplicate of a tracked media file. Additionally, the content included in the created database may be queried for matches between the known file identifiers and the unknown media file identifiers. An exemplary identifier generating algorithm for use with video files will be considered first.

EXAMPLE 1

Identifier Utilizing Word Count for Video Files

"Video files", as used herein, includes any file the includes a series of digitally encoded images for sequential play. This may include, for example, commercial feature films, music videos, webcast news and entertainment programming and so on. Although several identifier generating algorithms for video files are contemplated, at least one embodiment of the invention may use an identifier generating technique for video files based on a word count technique.

Typically, video files include computer coding for displaying a sequence or series of images which are viewed (e.g., using a personal computer or similar device) in rapid succession to produce the illusion of motion. Some of the exemplary video file content recognition procedures explained below utilize methods that perform calculations on selected individual images or pictures (or groups of images or pictures) in the sequence. It should be understood that the terms "image", "frame" and "picture" are synonymous; therefore, these terms are used interchangeably. As explained below, in at least one embodiment of the invention, a video file may be fingerprinted by an algorithm that generates a data set for each image or for selected images (e.g., such as every $n^{th}$ image) of each video file, each data set representing the number of words used to encode each selected image (or group of images). The word count calculated for each of the selected images may be stored as an "identifier" for the particular video file or this data may be further processed or compressed to generate a word count identifier. The file identifiers may be stored in a database of the tracking system and may be associated with metadata (e.g., title, date of creation, name of the owner, and so on) which may be related to the media file from which the fingerprint was derived.

Generally, each image of a digitally encoded video may be viewed on a screen of a display device (such as a computer monitor) as an array of discrete picture elements called "pixels". Several attributes are defined for each pixel in a particular image. Data stored in a video file defines the attributes of each pixel for each frame. Pixel attributes include color, intensity and brightness. The data in each video file may be stored in binary form (that is, as a series of bits or 0's and 1's). Binary data may be grouped into units called "words". A word may contain 32 bits of data, for example. As will become apparent, a measure of the number of words used to encode images (or groups of images) of a video can be related to the complexity of each image and may be used to generate an identifier for each video.

Before the word count technique is described in more detail, it should be appreciated that the present invention contemplates the use of a fingerprinting process in which the identifier generating algorithm in effect analyzes the level of complexity of selected frames (or selected groups of frames or pictures) of a video. (The distinction between "frames" and "groups of frames or pictures" is explained below.) In this approach, each selected frame or group of frames (where the selected frames may be every frame, the first n frames or every $n^{th}$ frame, for example) may be analyzed to calculate its level of complexity. Frame complexity may then be tracked or "plotted" to discern a trend in the level of complexity of the series of selected frames. An exemplary process for measuring and tracking the complexity of frames may be based on a technique that uses the word count technique.

To understand the word count technique (and to understand the distinction between single pictures and groups of pictures), it should be appreciated that, generally, videos (such as movies) are stored in a file format that utilizes some form of data compression. Some file formats use a simple single frame compression technique in which the series of frames of the video may be stored as a series of compressed single frames. When single frame compression techniques are used for video file storage, the total number of words required to store each frame may be measurable so that a word count may be calculated for each frame. If the level of complexity of a particular frame is high (e.g., relative to the complexity of other frames in the video), then the word count for that particular frame is high. With this type of file compression, a word count image (that is, per frame) may be measured and plotted. If word count per frame is plotted over the entire length of the video, for example, (or, alternatively, for selected frames) a waveform can be derived from this data that may be a unique media file identifier (or "fingerprint") for the source or "known" video file. This media file identifier may be referred to as a "word count identifier". This fingerprint based on word count per selected frame may be a robust and highly reliable identifier because it may be essentially unchanged even if the source video may be altered from its original form by, for example, being recompressed, distorted or re-recorded at a different bit resolution or "bit depth" (such as 24 bit as opposed to 16 bit, for example).

However, most motion picture file storage formats utilize compression techniques that compress several sequential frames as a group. Commonly used movie file compression techniques (such as MPEG) use a key frame-based compression scheme that compresses groups of pictures (also referred to as "GOPs") together. (It will be recalled that the terms "image", "frame" and "picture" are considered to be synonymous herein. The terms "video" and "movie" are also considered be synonymous herein as well. With this type of file compression, a word count per group of pictures (that is, per "GOP") may be measured and plotted. If word count per GOP may be plotted over the entire length of the video, for example, (or for selected GOPs) a waveform can be derived from this data that may be a unique media file identifier (or word count identifier) for the source or "known" video. This word count identifier (based on word count per GOP) may be robust and highly reliable because it may be essentially unchanged even if the source video may be altered by being, for example, recompressed, distorted or re-recorded at a different bit resolution or "bit depth" (such as 24 bit as opposed to 16 bit, for example).

Because each picture (when a single frame compression technique such as JPEG is used) or each group of pictures (when a multiple frame compression technique such as MPEG is used) of a video file can be considered to be encoded as series of words, the number of words used to encode a particular picture or a particular GOP in the compressed domain is referred to herein as a "word count". Hence, the word count methodology (and the use of a word count technique to produce a word count identifier) can be implemented on and is applicable to video files that use any video compression technique. Hence, although the present discussion of the word count technique focuses on multi-frame compression techniques such as MPEG, it is also applicable to single frame compression techniques such as JPEG.

Complexity in video compression algorithms based on the discrete cosine transformation (which includes the JPEG algorithm and the MPEG compression algorithm) is a measure of how much of each image lies in the different frequency bands. If, for example, all of one particular image lies in one frequency band, then that image may be deemed to have a relatively low level of complexity. As a specific example, if every single frame in a particular video is exactly the same color, the video would have a very low level of complexity and the complexity could be described using a very small number of bits (and thus a very low number of words because each word contains a predetermined number of bits). This would, therefore, yield a very low word count for each image and the word count would be equal for each image of the image. If the word count per image were to be plotted over an entire video, for example, it would yield a straight line.

As another illustration of image complexity, if the pixels in each row in each frame of the video alternate between black and white, the discrete cosine transform of this signal would show that all the information is contained within a high frequency band, with little or no information in the low frequency band.

As still another example of image complexity, if the pixel values are randomly distributed as is the case, for example, when a source of white noise is displayed by each image of a video, the word count for each frame would be extremely high. If these white noise-generated images were encoded in MPEG format, for example, in any group of pictures (that is, going from I-frame to I-frame, or from key frame to key frame), the word count would be very large because each frame shows a very noisy, chaotic image.

The word count of a commercial entertainment movie typically varies from image to image so that a word count can be calculated and plotted for each image. The resulting representation of the word count provides a word count identifier for the entire movie that may be stored in a database and searched against to identify tracked movie files.

EXAMPLE 2

Identifier Utilizing Image Vectors For Video Files

In accordance with at least one other embodiment of the invention, a video file is fingerprinted by generating a data set called an "image vector" for each image or selected images of each video file. The image vectors generated for the selected images are stored as an "identifier" for the particular video file. The file identifiers are stored in a database of the tracking system and are associated with metadata (such as title, date of creation, and so on) related to the media file from which the fingerprint was derived. The image vectors allow the portions of the underlying image to be identified. The algorithm described here is an example of one approach to image recognition. Use of other image recognition techniques is also contemplated.

As mentioned previously, each image of a digitally encoded video may be viewed on a screen of a display device (e.g., a computer monitor) as an array of discrete picture elements called "pixels". Several attributes are defined for each pixel in a particular image. Data stored in a video file defines the attributes of each pixel for each frame. Pixel attributes include color, intensity and brightness.

Each image vector may be created by applying an image vector generating algorithm to pixel image data stored within a video file. Thus, in effect, an image vector is an ordered sequence of bits created by the image vector generating algorithm from pixel data sampled from a digital image by reading the data in the file. Each image vector may include two components: 1) one or more "warp grid vectors"; and 2) (optionally) global information. "Global information" is information about the entire image (i.e., frame). The global information for a particular image may include image measurements such as color histograms and discrete cosine transform coefficients. As will become apparent, a wide range of pixel attributes can be selected from to create the warp grid vectors.

Each warp grid vector may be calculated from a video file using a warp grid algorithm (also called simply a "warp algorithm"). The process of calculating a warp grid vector using the warp grid algorithm can be understood from FIGS. 1–8. FIG. 1 is a black and white representation of a color image 10, which is exemplary only. The warp grid vectors are derived in the same way from any image in a video. Thus, image 10 may represent a single frame or image from a protected or "known" video file or from a target or "unknown" video file. Although image 10 represents a color image, the warp grid algorithm can be applied in a similar way to a black and white image from a video file.

Figure 2:
FIG. 2 is a black and white reproduction of a red color channel portion of the image of FIG. 1.

In this example, the image attribute upon which the warp grid algorithm may be executed is the brightness values of the red color channel at each pixel of the image 10. Red pixel brightness values range from 0 to 255 and are represented here as brightness values ranging from black to white respectively. FIG. 2 shows a black and white representation of image 12 comprised of only the red color channel of the digital image 10 of FIG. 1.

The images 10, 12 are comprised of pixels (not individually distinguishable in the figures). As will become apparent, the warp algorithm can "recognize" broad patterns of color, shape and texture, much as the human eye perceives the image itself. To illustrate the operation of the warp grid algorithm to derive a warp grid vector, an initialized warp grid 16 (shown in isolation in FIG. 3) is constructed. A warp grid 16 may be an M-row by N-column set of grid points 18, which may be "superimposed" on image 12. The grid points 18 are contained within a rectangle 1 unit in length on each side. The grid 16 may be centered at and oriented to a Cartesian coordinate system having the coordinates u and v.

Figure 3:
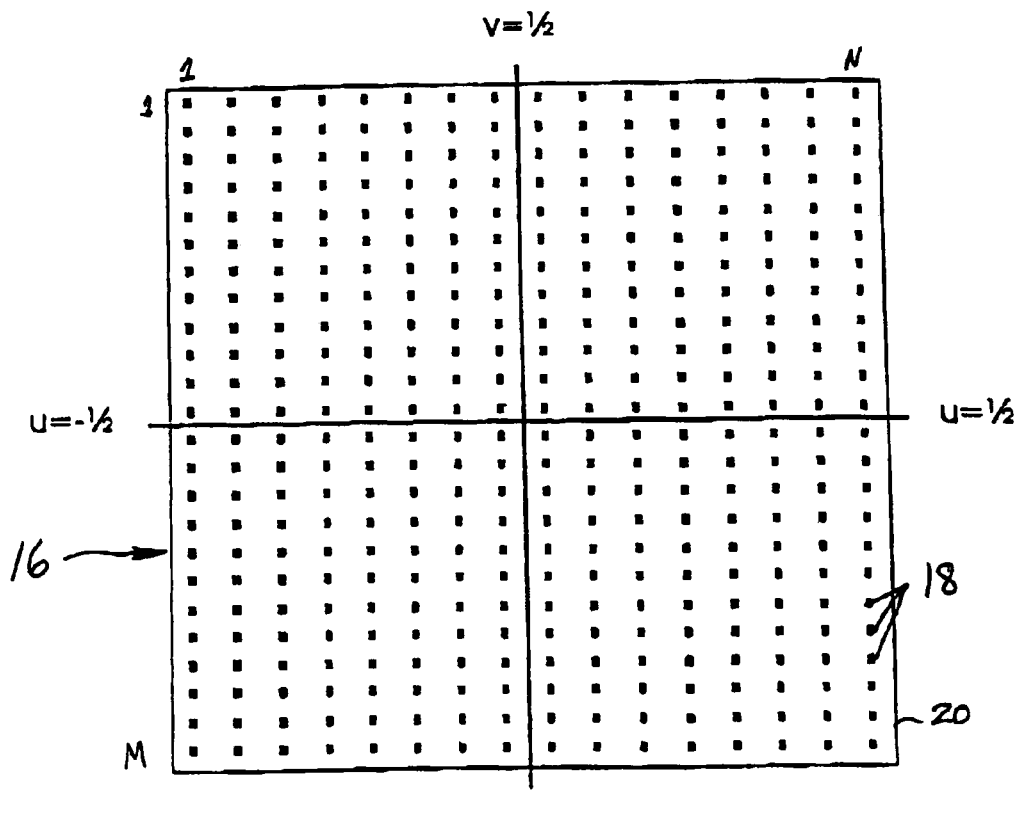
FIG. 3 is a 16×24 initialized, warp grid plotted on a u-v coordinate system.

FIG. 3 illustrates an exemplary 16-by-24 initialized warp grid 16 plotted in the u-v coordinate system. All grid points 18 of the exemplary warp grid 16 are uniformly spaced within a 1 unit-by-1 unit rectangle, illustrated here by the solid boundary 20 around the grid 14. Although the grid points 16 are represented here by an array of black rectangles, each grid point 16 may be dimensionless and represented by an ordered pair of floating point numbers, (u, v). The grid 16 may be superimposed on all of or on a portion of an image from which a set of warp grid vectors may be derived. The two dimensional area of the image may be considered to x, y space for reference. Thus, when the grid 16 is superimposed on an image, this process can be thought of as a mapping or as a translation of u, v space into x, y space.

Figure 4:
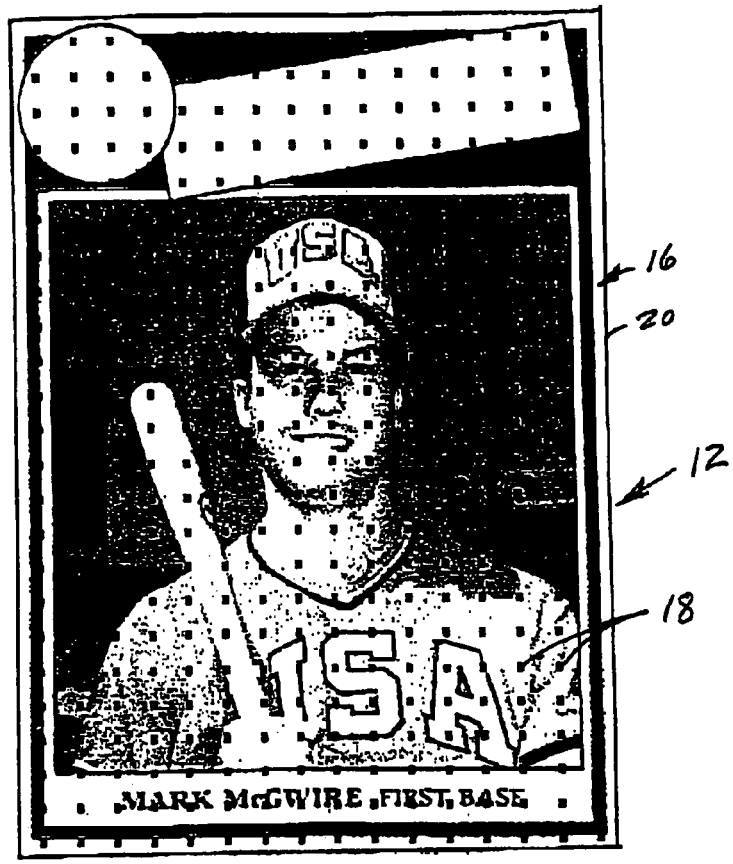
FIG. 4 shows the initialized warp grid of FIG. 3 superimposed on the image of FIG. 2.

More specifically, FIG. 4 represents the initialized 16-by-24 warp grid 16 of FIG. 3 superimposed on the red channel of the image 12 of FIG. 2. However, it should be understood that this is exemplary only, and that the warp grid algorithm can be executed on a wide range of image attributes.

The grid 16 can be superimposed on all of or on any portion of the image 12 from which vectors are to be derived. In other words, the warp grid bounds 20 can be positioned anywhere on the image 12 in terms of x, y space. In the present example, this may be done by superimposing the rectangular boundary 20 on the boundary (i.e., the outer edge) of the image 12 so that the grid 16 may be placed uniformly across the entire image 12 (i.e., so that it covers all of the x, y space). Because the boundary of the image 12 may be rectangular, the grid points are uniformly distributed over the image 12. However, it should be appreciated that the warp grid algorithm does not require that the grid 16 be uniformly spread over the image 12. Rather, the grid points 18 may be non-uniformly distributed over the entire image 12, for example, uniformly distributed over a portion of the image 12 or non-uniformly distributed over a portion of the image 12. As will become apparent, during execution of the warp grid algorithm, a warp grid vector may be generated for each grid point 18 in the grid 16.

Preferably, the number of points 18 in the warp grid 16 may be substantially less than the number of pixels, which make up the image 12. For example, while each exemplary image 10, 12 may be comprised of 354-by-512 pixels (for a total of 181,248 pixels) and there are only 384 warp grid points 18 (i.e., 16×24) superimposed on the image (which corresponds to 384 pixels on which the algorithm will be executed). Therefore, the total number of pixel memory accesses performed by the warp algorithm may typically be less than the total number of pixels in the image, and frequently much less. The number of grid points 18 used when fingerprinting a media file to be tracked may be determined by considering the desired performance and the desired size of the resulting image vector database. In general, the greater the number of warp grid points 18, the greater will be the sensitivity of the image vector database to the details of the composition of the images it contains. However, as a result of the increased sensitivity, the size of the resulting database will increase.

The points 18 of the warp grid 16 may be initialized and each may be indexed as the $m^{th}$ column and $n^{th}$ row of the grid, starting with 1 at the upper left-hand corner of the grid 16. This index represents the "identity" or starting point of each grid point, and these starting points do not change during execution of the algorithm, although the grid points do, in effect, move. During execution of the algorithm, the current location of each grid point 18 may be stored in a current point variable as a pair of u, v coordinates which represent the location of each grid point 18 after each iteration of the algorithm. Each pixel of any particular image of a video has an associated level variable, which is a relative measure of the chosen attribute for that particular pixel (e.g., the brightness of the red component). The level of each grid point 18 is the level of the underlying pixel.

Two level values are associated with each grid point 18: the initial level of the grid point and the current level of the grid point. The initial level of each grid point does not change with each iteration of the algorithm, but the current level of each grid point may change. The current level of each grid point depends on the current position of each grid point after each iteration of the warp grid algorithm. The initial value and the current value of each grid point are stored in associated level variables. Thus, upon initialization of the warp grid, starting points and current points are identical. Starting points remain unaltered and represent the record of the original locations of the grid points. Current points are updated with each iteration of the warp algorithm.

After the warp grid 16 is fully initialized, the iterative process of adapting the grid 16 to the digital image may be commenced. Each iteration of the warp grid algorithm may calculate a current point or "position value" for each grid point 16 and, in effect, move each of the grid points to this new current point. Thus, the new current point can be thought of as being a new location, which may be calculated based on the sampled value of each point at its current location and on the value of each point of a subset of points surrounding each grid point. This subset and this process can be understood from FIGS. 7 and 8, which are described below.

More specifically, each grid point 18 may be completely or partially surrounded by a subset of points referred to as the "connection pattern" for a particular grid point 18. Each given point 18 in the warp grid may be associated with a finite set of surrounding points called "neighborhood points". The neighboring points surrounding a particular grid points comprise the "connection pattern" of that particular grid point. For a particular set of grid points 18, the connection pattern of each point is identical to the connection pattern of all other points. An initialized warp grid is completely characterized by the locations of all its points and the connection pattern surrounding each point. The warp grid connection pattern is, in effect, the subset of points that determine how a particular warp grid point "moves" during a particular iteration of the warp grid algorithm. In other words, the numeric value of the pixel attribute associated with each grid point and the numeric value of the pixel attribute associated with each neighborhood point in the connection pattern of that particular grid point are used to calculate the new current point of that grid point during a particular iteration of the warp grid algorithm.

Figure 5:
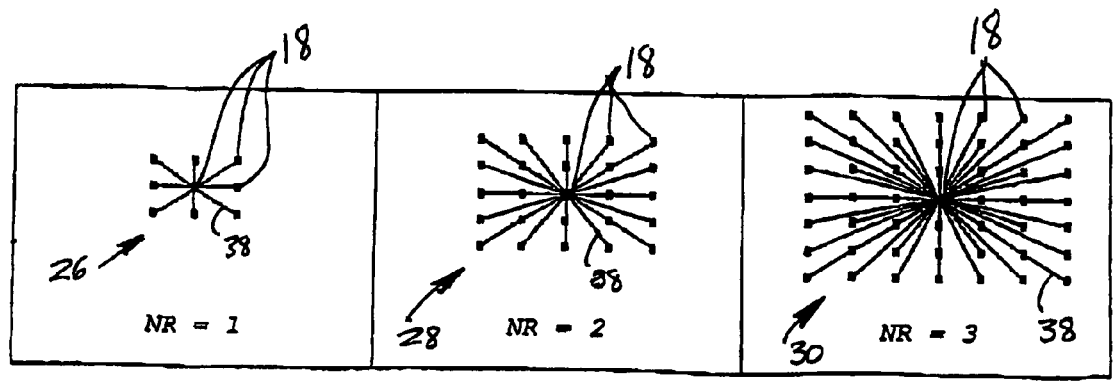
FIG. 5 shows three potential connection patterns for a grid point of a warp grid.

FIG. 5 illustrates three alternative examples of connection patterns 26, 28, 30 that can be used with the initialized warp grid 16 illustrated in FIG. 3. The connection patterns 26, 28, 30 are also called "neighborhood configurations". Each exemplary neighborhood configuration 26, 28, 30 includes a central grid point surrounded by one or more "layers" of surrounding points (each layer is rectangular in this example). A neighborhood configuration may be defined by its neighborhood radius (NR), which is the number of layers surrounding the central point. NR equals 1, 2 and 3, respectively for the neighborhoods 26, 28, 30. The lines 38 shown connecting the central point to its surrounding points are included in FIG. 5 to illustrate the relation of the central grid point to each neighborhood point.

After each iteration of the warp grid algorithm, the positions (indicated by the values of the set of current point variables) of all the warp grid points are modified based on sampled pixel values in the digital image. As the position of (i.e., the current point of) each grid point changes, its connection pattern moves with it. Thus, if a warp grid point moves, the position and configuration of its connection pattern relative to the given grid point does not change with each iteration of the warp grid algorithm. In other words, each point in the warp grid remains connected to the points in its respective connection pattern regardless of the position (current point value) of that grid point in the u, v space.

The connection pattern of each point 18 is homogenous over the entire warp grid 16 even if a given point lies at or near an "edge" or boundary line 20 of the warp grid 16 because points 18 at or near the edges of the grid 18 are considered to be "connected to" or continuous with grid points on the opposite edge of the grid 18. For example, points along the top edge of the grid are considered to be adjacent (and therefore continuous with and connect to) points along the bottom edge of the grid. Similarly, points along the left edge of the grid are considered to be continuous with points along the right edge of the grid. In terms of the warp grid point indices m and n, the indices are computed as m mod M and n mod N. Thus, both the image and the warp grid are treated as if they were totally wrapped around a toroidal surface with opposite edges "joined" (that is, overlying one another), thereby making the surfaces seamless and homogeneous. Toroidally wrapping the digital image and the warp grid in this manner eliminates the concerns of edge effects in the calculation of the positions (i.e., current point values) of the warp grid points with each iteration of the warp grid algorithm or the subsequent calculation of warp grid vectors after iterations have been terminated.

Each grid point 16 falls within the local boundaries of a unique pixel in the image 12. Each grid point "samples" the associated pixel by determining the numeric value of the chosen pixel attribute for that pixel. The pixel attribute of the associated pixel is called the "level variable" or simply the "level" of that particular grid point. The level can be any single valued function of one or more variables that can be measured from the associated pixel. For example, if the image is a grayscale image, the sampled level of a particular grid point can be taken to be the gray level of the associated pixel. If the image is in color, the sampled value could be the level of the red, green or blue components of the underlying pixel, or could be a combination of one or more color components such as the color (i.e., hue), saturation (i.e., intensity) or brightness of the pixel. Other measurable pixel values include temperature, emissivity, density or a combination thereof. The levels of all grid points (and of the associated neighborhood points for each grid point) may be measured and stored prior to each iteration of the warp grid algorithm.

The grid 16 is spatially adapted to the image 12 with each iteration of the warp grid algorithm. Each given point 18 of the grid 16 may be displaced in the u, v coordinate system from its current position by an offset vector determined from the sampled values and positions of the grid points within the connection pattern of the given grid point 18. Each point 18 in the warp grid 16 is displaced with each iteration in accordance with a basic offset calculation described below.

In this exemplary procedure for calculating the offset vector to be applied to a given grid point in the warp algorithm spatial adaptation step, the offset vector is calculated from the positions and sampled values of all the grid points in the connection pattern surrounding the given current grid point. Preferably, the offset vector for each current grid point is calculated as a scaling of the position of the center-of-gravity of all of the points in the connection pattern of the given current grid point relative to the position of each current point. In this center-of-gravity calculation, the individual connection pattern grid points are, in effect, weighted by their level values obtained from the associated (i.e., underlying) pixels.

A mathematical description of this center-of-gravity calculation will now be provided. Mathematically, if $p_0$ denotes the current position value of a given point in a warp grid measured in the u, v coordinate system and $\{C_0\}$ denotes a set of C points which constitute the connection pattern of $p_0$, including $p_0$ itself, then the center of gravity of the connection pattern, $p_{\{co\}}{}^{CG}$, is given by:

$$p\{C_o\}^{CG} = \frac{\sum_{p \in \{C_o\}} [L(p) \times p]}{\sum_{p \in \{C_o\}} [L(p)]},$$

where L(p) is the sampled level of the pixel associated with the point p. The offset to be applied in displacing the point $p_0$ may be calculated from the center-of-gravity $p_{\{C_o\}}^{CG}$ as:

$$p_0^{offset} = WR \times (p_{\{C_o\}}^{CG} - p_0).$$

A corresponding new point, $p_0^{new}$, in the succeeding iteration may be calculated from the preceding point $p_0$ and the center of gravity $p\{C_0\}^{CG}$. The displacement coefficient, referred to as the "warp rate", WR, is a number generally between zero and one, which is held constant over all points in the warp grid at a given iteration of the adaptation. In particular, the new point $p_0^{new}$ may be calculated as:

$$p_0^{new} = p_0 + p_0^{offset}.$$

If the warp rate, WR, equals 1 at each iteration of the warp grid algorithm, each warp grid point is displaced to the position of the center-of-gravity of its connection pattern, where each connecting point is weighted by its value taken from the digital image. For values of WR less than 1, the grid points are adapted in the direction of the center-of-gravity a distance proportional to WR. Thus, each connecting point influences the repositioning of a given grid point in proportion to the product of its level variable and its distance from the given grid point. Each new point $p_0^{new}$ may be used as $p_0$ for the next iteration of the algorithm.

Figure 6:
FIG. 6 shows final and intermediate positions of the grid points of FIG. 4 after three iterations of a warp grid algorithm.
Figure 7:
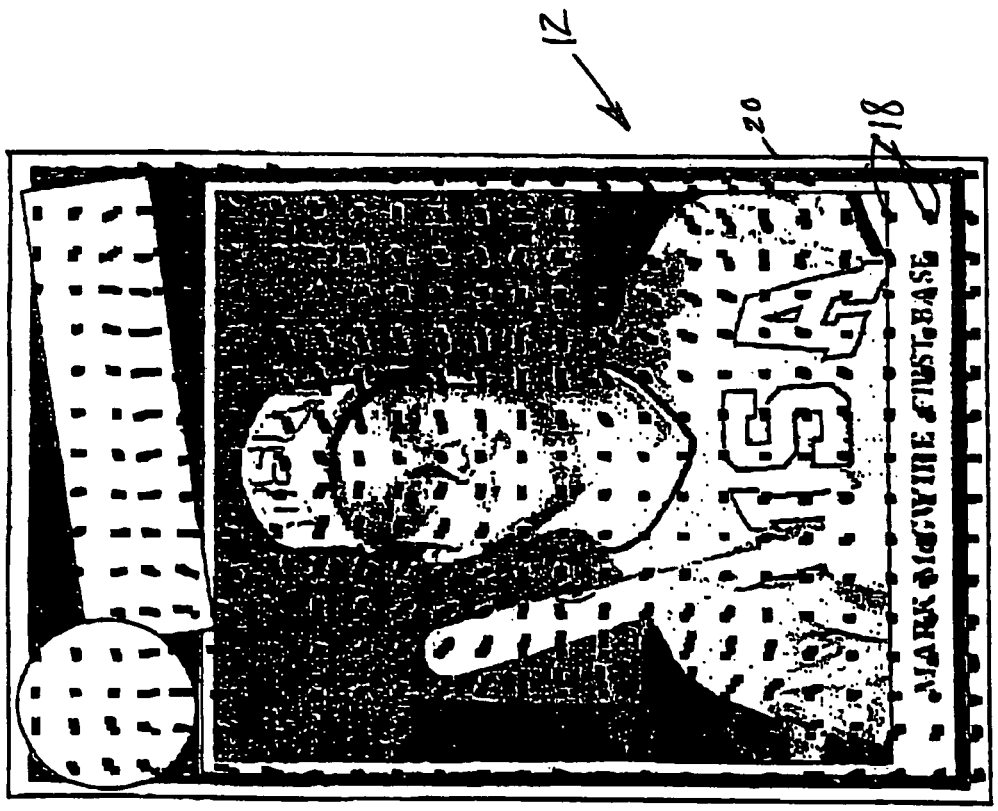
FIG. 7 shows the positions of the grid points of FIG. 4 after two hundred and fifty iterations of a warp grid algorithm.

As explained in more detail below, the algorithm may be executed for a predetermined number of steps or until the points of the grid reach equilibrium. FIG. 6 shows the current position of the grid (i.e., the positions of the grid points of the grid) of image 12 after three iterations of the warp grid algorithm. Three intermediate points generated by the three iterations are shown in FIG. 6 to illustrate how a warp grid vector generally "grows" incrementally from each initial grid point with each iteration of the warp grid algorithm. FIG. 7 shows the current values of each point in the grid after 250 iterations of the warp grid algorithm.

Figure 8:
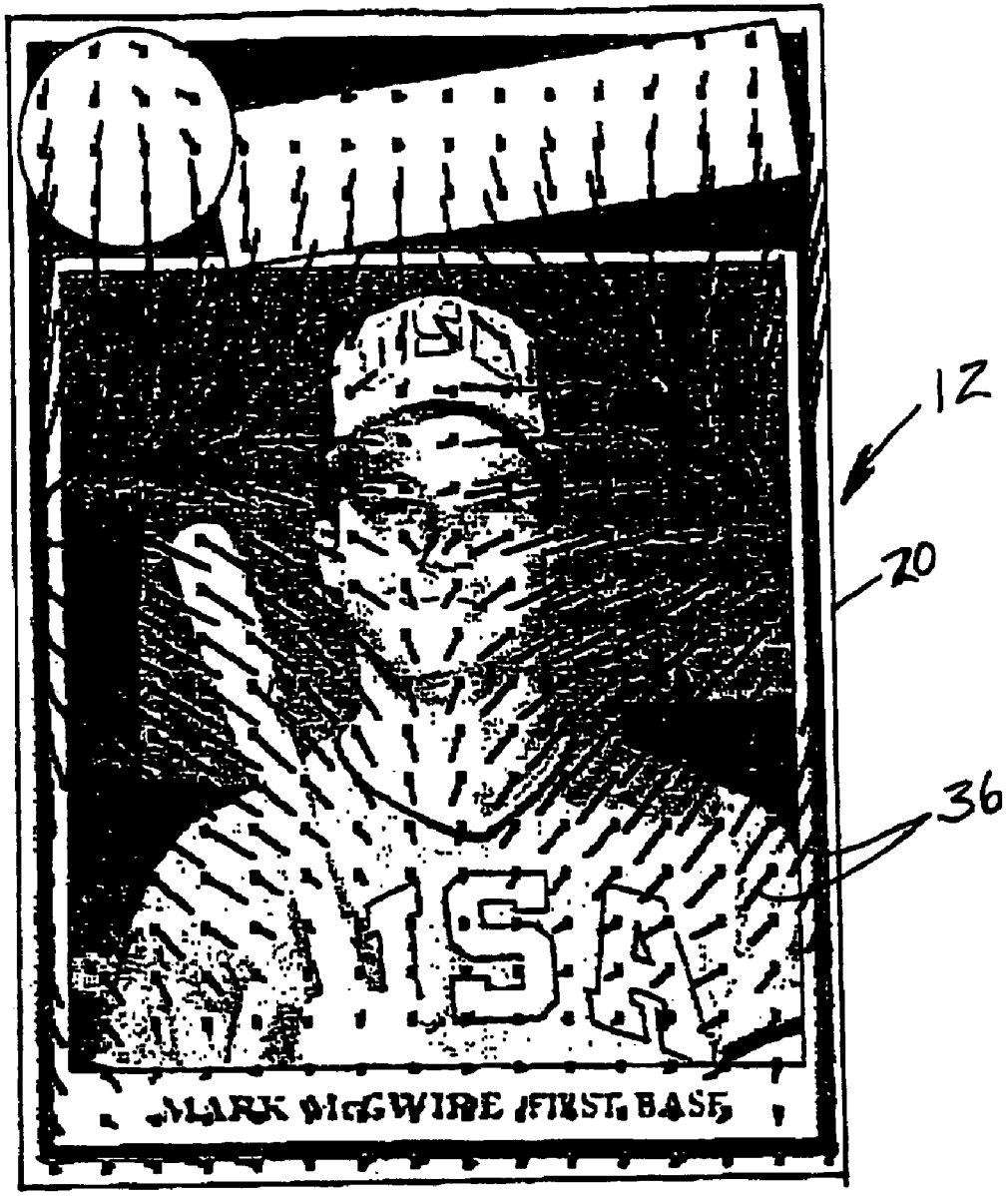
FIG. 8 shows the equilibrium positions of the grid points of FIG. 4 after execution of a warp grid algorithm.

It should be noted that the initial points of the warp grid algorithm are not shown in FIGS. 6 and 7. It should be understood that if the algorithm is deemed to have been fully executed after 250 iterations, a set of 384 warp algorithm vectors can be formed by, in essence, drawing a vector from each initial grid point (FIG. 4) to the associated final grid point (FIG. 7). FIG. 8 shows the 384 warp grid vectors 36 superimposed on the image 12. As explained in greater detail below, these 384 warp grid vectors may be stored sequentially as the components of a single vector called the image vector. The image vector is a fingerprint for each selected image of a video. Before the image vectors are described in greater detail and before several procedures for using a set of image vectors for video identification are described, further description is provided regarding the warp grid algorithm.

The WR (i.e., the warp rate) can be used to accelerate the process of bringing the warp grid to its equilibrium point and improve the stability of that equilibrium. For example, this may be accomplished by reducing the WR as the grid points approach their equilibrium points. As the change in position between steps decreases, the WR may also be also reduced. Thus, a relatively large WR may be used in a first series of iterations to advance the grid points by relatively large distances. Subsequently, the WR may be reduced in later iterations as the equilibrium point is approached.

As previously discussed, the level taken by a given grid point is derived as a function of the attributes of the pixel sampled at the given grid point position. As mentioned, typical pixel attributes include, for example, the intensities of the digital image's three color channels. The value of a grid point is generally a floating point number in the range 0 to 1 and may represent any function of its sampled pixel attributes. If, for example, the value is selected to be the normalized intensity r of the red channel in the digital image (normalized to the interval 0 to 1), then the warp grid points may be seen to be attracted to the red areas of the digital image in the warp process, the brightest red areas having the most attraction. If, on the other hand, the value is chosen to be 1–r, then the points of the grid may be attracted to those areas of the digital image where red is at a minimum.

In computing the position of the center-of-gravity of the connection pattern of a given grid point $p_0$, either the actual values of all the grid points in the connection pattern may be used or the values may be taken relative to the value of the given grid point. For example, if L(p) denotes the level of a grid point, then a relative level for the grid point p in the connection pattern of $p_0$ may be the absolute difference between the level at p and the level at $p_0$, i.e., $|L(p)-L(p_0)|$. In this case, supposing that the L(p) are proportional to the red channel intensities, the warp grid will be seen to deflect locally in the direction of the strongest red channel contrast, that is, an area of the digital image containing an edge or other abrupt change in the red component of the picture. On the other hand, if the connection pattern grid point levels are computed as $1-|L(p)-L(p_0)|$, then the warp grid may appear to be displacing locally in the direction of uniformly red colored areas.

If the center-of-gravity of the grid point weightings are computed as $L(p)-L(p_0)$, then only positive contrasts will attract grid points, while negative contrasts will repel them. Here, positive contrast is defined as an increasing level L(p) in the direction of positive u and v.

Although the previous explanation of the warp algorithm references an example using a center-of-gravity of the connection pattern, any function of the connection pattern grid point positions and levels can be used for computing the offsets in the adaptation step of the warp algorithm. For example, rather than the center-of-gravity, the offset vectors may be computed as being proportional to the vector drawn from a given grid point to the grid point in its connection pattern with the highest level. However, not all functions will yield an equilibrium configuration of the warp grid.

Generally, after each iteration of the process, it must be determined whether the warp grid has been iterated or "adapted" sufficiently to fully characterize the image. If not, another iteration must be performed. If the grid has been adapted sufficiently, there is enough information to create the warp grid vector simply by taking the difference between the value of each current point and the corresponding initial or "starting" point. Each difference may be represented by a pair of values (each of which is typically specified by a floating point number), which represents "displacement vectors". Each displacement vector constitutes one element of the warp grid vector.

Several criteria can be used to determine if the warp grid is adapted to the digital image to a degree sufficient for image recognition. For example, the algorithm can be executed for a fixed number of iterations, the number being presumed to be sufficient. The number of iterations required could be determined experimentally based on trials with large numbers of representative media files.

Alternatively, a determination may make use of the behavior of the warp grid points themselves to determine when to terminate execution of the algorithm. With each iteration of the algorithm, the current points are "offset" or moved in the direction of the center-of-gravity of each grid point's connection pattern. This incremental movement of the current points increasingly "warps" (i.e., produces asymmetry in) the grid of the current points with each iteration. This is why the process is called a "warp" algorithm. In general, each successive iteration of the warp algorithm deforms the grid further and further until an equilibrium is reached, which can be defined as a state in which the current points move very little or very slowly (i.e., so that the movement is not significant) or not at all.

Grid points in equilibrium self-organize spatially over a digital image. A grid point is in equilibrium when the tensions exerted by all its connecting grid points (that is, all the grid points in the connection pattern) balance and cancel each other out. A warp grid achieves equilibrium when all its grid points have achieved equilibrium.

The equilibrium configuration depends only on the relative characteristics of the pixels which comprise the underlying image (i.e., the patterns of color, shape, texture, etc. of the image) and does not depend on the absolute values of the individual pixels in a digital image. This is significant because the characteristics of an image that determine the equilibrium configuration do not change significantly even if changes are made in file format or type, image resolution and so on. For example, if two digital images are compared, the images differing from one another only in resolution and in the image artifacts introduced by the method of compression, e.g., MPEG or Real Video™, the equilibrium configuration of the adapted warp grid for each digital image will be the same or very nearly so.

Although the equilibrium configuration of a given warp grid is primarily determined by the characteristics of the underlying digital image, equilibrium is affected by the size of the connection pattern surrounding a given grid point. The size of the connection pattern can be represented by the neighborhood radius variable, NR.

The WR does not have a significant effect on the equilibrium configuration. WR is essentially a scaling factor that determines how far each current point moves with each iteration; NR determines which neighboring pixels have an influence on its motion. It is important that neither of these parameters be chosen to be too large because there are settings of these constants that may cause the warp grid to never reach equilibrium. For example, if WR is too large, points may "jump" past their equilibrium point in one iteration, and "jump" past equilibrium in an opposite direction in the next iteration, and so on.

The algorithm can be written such that the WR is adjusted with each iteration of the algorithm. Reducing WR, for example, as equilibrium is approached produces a more stable and repeatable equilibrium configuration. This technique is sometimes referred to as "synthetic annealing".

Rather than depending upon a fixed number of iterations, the test for determining when to end the adaptation process may be based on how close the warp grid has come to its equilibrium configuration. One possible measure for determining how far towards equilibrium the adaptation has progressed is by summing the individual grid point offset magnitudes after a particular iteration and then terminating the iterations after this sum has dropped below a predetermined threshold level.

As will become apparent, two images can be compared to see if they match (or, more precisely, to see if there is a high probability that they match) by generating warp grid vectors from each image and then comparing the warp grid vectors to see if they are similar. The degree of similarity of two matched pictures can be predicted by the similarity of their adapted warp grid vectors. Comparing warp grid vectors is similar to comparing the similarity of the associated equilibrium or adapted warp grids. The degree of similarity of two adapted warp grids may be based on the distance (called the "match distance") they are separated from one another in the multidimensional space of the warp grid vectors.

To optimally compare two adapted warp grids (that is, to compare two sets of warp grid vectors derived from two separate images, for example), their initial sampling grids must be of the same dimensions and, in general, their connection patterns should be the same. Furthermore, the number of warp algorithm iterations for each should be the same. Also, their WRs should be equal or nearly so. However, even if all these conditions are not met, two adapted warp grids are still conditionally comparable if adaptation (that is, iteration) has been allowed to continue until an equilibrium configuration is reached. In this instance, equivalence between warp algorithm parameters are not as critical because the equilibrium configuration is primarily dependent on the characteristics of the images being matched, secondarily on the size of the warp grid connection pattern, and is highly independent of the speed with which the equilibrium is reached. However, the remainder of this discussion will assume (when comparing warp grid vectors from a protective image and a target image) equivalence of all warp algorithm parameters (number of iterations, WR, NR, size of warp grids, and so on) for unconditionally comparable adapted warp grids.

If the dimensions of the warp grid are M-by-N (that is, M columns by N rows, written M×N), then the adapted warp grid can be represented by an M×N dimension vector called a "warp grid vector". The elements of a warp grid vector are an M×N set of displacement vectors, each displacement vector representing the displacement of the warp grid point from its initial position during execution of the warp grid algorithm. Each displacement vector can be thought of as being a vector drawn from an initial grid point to the associated grid point represented by the equilibrium value of the current point derived from that initial grid point. Hence, each displacement vector is characterized by both u-direction and v-direction displacement components.

More specifically, to calculate a warp grid vector, let $p_{m,n}$, the warp grid point is denoted on the $m^{th}$ column and the $n^{th}$ row of the initial M-by-N warp grid. Letting $q_{m,n}$ be the corresponding point in the warp grid following some number of iterations of the warp algorithm, then the warp grid vector is a vector V of M×N elements $v_{m,n}$, where the elements are the displacement vectors:

$$v_{m,n} = q_{m,n} - p_{m,n}$$

taken in row-by-row order on the indices of the warp grid points.

The warp grid algorithm can be run on various images including a target image and a protected image (i.e., image to be tracked). The degree of similarity of the two images to one another can be determined by comparing the warp grid vectors to one another. For example, E and F may be two warp grid vectors, each being of dimension M×N and each being generated by executing the warp grid algorithm on a target image and on a protected image, respectively, the warp grid algorithm being run on each image for "I" iterations and with the warp rate WR. Then, the magnitude of the difference between E and F is given by the relationship:

$$\|E - F\| = \sqrt{\sum_{m=1}^{M} \sum_{n=1}^{N} \|E_{m,n} - F_{m,n}\|^2},$$

where:

$$|E_{m,n} - F_{m,n}|^2 = (Ex_{m,n} - Fx_{m,n})^2 + (Ey_{m,n} - Fy_{m,n})^2,$$

where $Ex_{m,n}$ denotes the x component of the $m^{th}, n^{th}$ displacement vector of E. $Ey_{m,n}$, $Fx_{m,n}$ and $Fy_{m,n}$ are defined analogously.

The degree of similarity of the two images is indicated by the "match distance" of the two vectors E and F. The match distance between two warp grid vectors E and F is the magnitude of their vector difference normalized by the number of elements in each warp grid vector, $$\text{match}(E, F) = \frac{\|E - F\|}{M \times N}.$$

Thus, the closeness of the match between the two warp grid vectors is the average distance between all the corresponding displacement vectors of the warp grid vectors. The units of the match distance measurement are pixels in the digital images of the matched pictures.

It is also possible to define the match distance between two warp grid vectors in alternate ways. For example, the closeness of match between a given warp grid vector E (from a target image, for example) and a warp grid vector F (derived from a protected image and stored in database, for example) can be based on the magnitude of displacement vector differences weighted by the values of warp grid samples at the grid points of E.

Letting $E_{m,n}$ and $F_{m,n}$ denote the displacement vectors of warp grid vectors E and F respectively, and letting $L(p_{m,n})$ denote the sampled level of the digital image at the point $p_{m,n}$ corresponding to displacement vector $E_{m,n}$, a weighted distance measure for E and F becomes the average weighted difference between the corresponding displacement vectors of E and F:

$$\text{weighted match }(E, F) = \frac{\text{weighted difference}(E, F)}{M \times N},$$

where the magnitude of the weighted difference of E and F is equal to:

$$\sqrt{\sum_{m=1}^{M} \sum_{n=1}^{N} L(P_{m,n}) \times \|E_{m,n} - F_{m,n}\|^2}.$$

The weighted matching criteria is useful in cases where an equilibrium configuration of the fully adapted warp grid is not particularly stable, that is, in those instances in which grid points exhibit small, seemingly random motions with continued adaptive iterations of the algorithm, causing the match distances involved to fluctuate. Examination of the circumstances of these grid point perturbations reveals that they arise in regions in the digital image with extremely small sampled values. In that case, the center of gravity of a connection pattern in the region is particularly sensitive to very small changes in the sampled values at the points of the connection pattern. The weighting match criteria described above place less emphasis on these "noisier" warp grid displacement vectors, yielding a more stable match distance.

An image vector can be constituted by at least one warp grid vector, or, alternatively, by a combination of at least one warp grid vector and at least one additional vector, the elements of which are global image data. Each warp grid vector is comprised of M×N displacement vectors. Thus, in some embodiments of the present invention, each image vector will contain only one warp grid vector. In this instance, two image vectors are compared by comparing the two warp grid vectors, which is to say, by comparing the displacement vectors which comprise the two warp grid vectors in a pairwise manner. In other embodiments of the invention, each image vector will contain more than one warp grid vector (one warp grid vector could be derived from the red color data of each pixel and another warp grid vector could be derived from the blue color data of each pixel, for example) so that two sets of M×N displacement vectors are compared during the comparison of the two image vectors.

In at least one embodiment of the invention, the media tracking system operates by generating an image vector for each selected frame of a protected video so that a sequence or series of image vectors are generated from a video file. The set of image vectors for each tracked media file may be stored in the tracking system database, each image vector sequence constituting an identifier for the tracked media file. This fingerprinting process can be carried out by the system administrator or, alternatively by the media file owner if the owner does not wish to relinquish possession of the library of media files to be protected. It should also be appreciated that this fingerprinting process does not change or alter the underlying media file. Therefore, this process is fundamentally different from those file recognition processes, which alter the media file, such as the process known as "water marking". It should be understood that two image vectors are compared to find a best match, not necessarily an exact match.

The process of comparing a target media file identify with each tracked media file identifier in the database is carried out by comparing corresponding image vectors in the respective sequence thereof in each file identifier. To more clearly illustrate the principles of the present invention, it will be assumed herein below that each image vector is comprised of a single warp grid vector (i.e., an M×N set of displacement vectors). A target media file identifier for a tracked media file identifier comprised of a sequence of image vectors will be referred to specifically as a "target image vector identifier" or a "protected image vector identifier", respectively," and both will be referred to generally as "image vector identifiers". The process of comparing two image vector identifiers is considered in detail immediately below.

From the preceding discussions it can also be understood that a best match to any given image vector of a media file identifier may be obtained from a pairwise comparison of the given image vector to the corresponding image vector in all media file identifiers in the database and noting which one yields the closest match. This type of pairwise comparison may be carried out for each image vector in the query media file identifier. An identifier match score can be computed that is the sum of the match scores of the corresponding image vectors. The question of whether a given database contains a match to a given media file identifier is equivalent to the question of whether the best match in a database is sufficiently close to be considered to have arisen from the same sequence of images. Thus, the matching distance of the best match must be compared to a specified maximum allowable (i.e., threshold) matching distance to be considered to have arisen from the comparison of media file identifiers derived from the same images.

Likewise, when attempting to find all the matching media file identifiers in a database that match a given query media file identifier, it may be necessary to consider the question of how many matching media file identifiers are sufficiently close to have arisen from the same image. This can be determined by comparing all the identifier match distances against a suitably chosen threshold match distance. Ultimately, the question of the size of the database of the media file identifiers and the number of computational steps required to select the best matching identifiers must be addressed. As least one exemplary embodiment of the invention minimizes both database size and the number of computational steps in selecting image vector identifier matches.

The size of the database of image vector identifiers is the number of image vector identifiers in the database times the number of bytes in an image vector identifier. If it is required to find the best matching image vector identifiers from a database, then each image vector identifier in the database can be compared to the query image vector identifier.

To optimize searches, the image vectors which make up the image vector identifiers may be made as small as possible while still allowing accurate image identification and the search process may be carried out in such a way as to eliminate unnecessary comparison operations for matching corresponding image vectors.

One way to reduce the size of an image vector is to reduce the size of the associated warp grid. However, the quality of image vector matches improves as the warp grid dimension increases. Another way to reduce image vector size is to use a relatively fine warp grid (where "fine" refers to a grid having a relatively high number of grid points) to generate the set of displacement vectors (using the warp grid algorithm) but then to sample the adapted warp grid points (that is, the displacement vectors) before creating the image vector. It should be appreciated that using an image vector derived by taking a 4-by-4 sample of a 16-by-16 adapted warp grid is more accurate than using an image vector derived from a 4-by-4 adapted warp grid. This is important because a typical connection pattern defined on a relatively fine warp grid covers only a small region of the image, whereas a connection pattern on a relatively coarse grid will typically span most of the image. Thus, the grid points of the fine grid will be relatively more sensitive to local variations of the image than will be the grid points of the relatively coarse grid.

Sampling the warp grid to derive the image vector is effective in creating image vectors with significant discrimination power. Part of the reason for this lies in the "holographic" nature of the warp vectors in an adapted warp grid. It should be appreciated that, at each iteration of the warp grid algorithm, the influence of any given grid point may be propagated through the warp grid to adjacent points in its connection pattern. Therefore, when the number of warp algorithm iterations is comparable to the warp grid dimensions, the influence of a single grid point may be felt by every grid point. It is through the process of adaptively balancing all of the influences from all of the grid points that an equilibrium configuration of grid points is reached. Thus, each displacement vector in the warp grid may carry information from the totality of all pixel values sampled during the iterative steps of the warp algorithm.

As a result, a given selection or sample of the displacement vectors of an adapted warp grid is highly effective at differentiating between and identifying images. Even though a given displacement vector in the selection is not itself directly sampling a given region of the image, the given displacement vector is nevertheless influenced by those pixel levels in the given region of the digital image which are sampled by other unselected grid points in the warp grid.

In addition to sampling the warp grid, the database of image vector identifiers can be reduced in size by reducing the number of bytes necessary to represent a particular warp grid vector. For example, if each warp grid vector component (that is, each displacement vector) requires 8 bytes for storing as a floating point number, then, if each component is stored as a 2 byte integer, the required storage space is cut to 75% of the original required storage space.

Another way to reduce the size of image vectors that make up the image vector identifiers is to store a subset of the sampled grid points (that is, displacement vectors). This can be done, for example by keeping only those displacement vectors which have values that are greater than a predetermined threshold value or, alternatively, by taking a predetermined number of displacement vectors and then selecting those displacement vectors having the highest values. These approaches allow one to retain only the most valuable information in each stored image vector. Thus, a distinction may be drawn between each stored image vector and the full image vector from which it was derived. A database query can be carried out using a full image vector (from a target file, for example) which contains the full set of vectors, even though each stored image vector (from the protected files, for example) only contains the most useful displacement vectors because each stored image vector retains information as to the original location of each displacement vector selected for storage. Therefore, a full image vector can be compared meaningfully with each stored image vector.

A number of ways to optimize the database search process are contemplated. One way to reduce the number of computational steps required to search the database is to eliminate unnecessary computation. For example, if one is searching for a best match, the smallest identifier match distance found so far can be stored as a smallest distance variable. Subsequently, if on is performing pairwise matching of the vectors of the identifier stored in a given record in the database (where each image vector identifier is stored in a record), operation may be stopped as soon as the value of the smallest distance variable is exceeded. Thus, operation may move on to the next record. Similarly, if one preorders all of the records in a database according to a chosen identifier, then another way of eliminating unnecessary computation is by selecting a minimal acceptable match score, and continuing the search until the minimal acceptable match score exceeds the last image vector identifier compared.

To implement a more efficient search for a matching image vector identifier, all of the image vector identifiers in the database (and all image vector identifiers generated from query or target media files) may be given an index number and identifiers in the database are sorted according to this index number. Image vector identifiers can then be selected from the image vector identifier database by performing a binary search on their sorted indices for a desired index. A vector index key is derived from each constituent image vector of each image vector identifier by sampling preselected measurements from each image vector (referred to as image vector "elements") and quantizing or mapping these pre-selected measurements into a small number of intervals.

These image vector elements are referred to as "tumblers" in the context of producing index keys. Each one of these tumblers is given a discrete value based on the value of the corresponding image vector element, quantized to the desired number of intervals (the intervals are referred to as "bins"). A series of vector index keys is generated from the series of image vectors of each image vector identifier. These individual vector index keys can be used to form an identifier index key by, for example, concatenation. It should be appreciated that it is possible for two or more different image vectors in the database to have the same index. Identifier index numbers in the database are not necessarily sequential; rather, there are frequently large gaps in the indices between adjacent identifiers.

Any number of criteria could be used for selecting the tumblers from the image vector to be used in producing its index key. For example, one may select tumblers based on their color value, hue, intensity, location, etc. Which criterion or combination of criteria is chosen depends upon the specific application, especially upon the general nature of the images in the database. In fact, an image vector database could be indexed in multiple ways, adding to the flexibility and effectiveness of the system. For example, looking through the database for a black and white image might be more effectively done via intensity-based index keys, rather than R, G, B-based index keys.

It should be appreciated from the discussion above that image vectors are well-suited for fingerprinting and recognizing individual images and can be adapted for video recognition. For example, a series of image vectors can be derived from selected images of a tracked media file and combined to form an image vector identifier for that tracked media file. An image vector identifier can then be created from each target media file. Therefore, a target media file identifier can be compared to each tracked media file identifier in the database to find a match (or matches). Thus, it should be understood that image vector technology may be used to recognize a series or stream of images by simply generating an image vector for each image of the video or for each nth image (or frame) of the video. Subsequently, theses image vectors may be stored in the database (when they are generated from files to be protected) or may be used to search the database with these vectors (when they are generated from target files). However, in accordance with at least one exemplary embodiment of the invention, this simple use of the image vector technology is enhanced for a particular application, e.g., recognizing video streams.

To understand the contemplated enhancements, it should be understood that typically, although a "complete" set of image vectors has been created and stored in the database as an identifier for each tracked media file, each image vector of the set of image vectors derived from each target media file can be used to query the database as it is created. As each image vector from the target media file is compared with a corresponding image vector in a particular tracked media file identifier, a match distance variable can be updated. If a comparison of the first few images of the target file result in a match distance above a threshold level, the comparison can be halted after a few images have been compared because it can reasonably concluded that the videos are dissimilar. Similarly, if the match distance from the first few image comparisons is below a threshold level, the image vector comparisons can be halted after a few images have been compared because it can reasonably be concluded that the videos are similar. Thus, the database may be queried with a stream or series of image vectors from each target media file. This allows considerable savings in time and computing resources.

Each image vector provides a very strong identifier for the associated image. Although a given image's image vector may not be unique to that image, when a target video's stream of images is being analyzed, the subsequent database lookup can analyze the way in which the fields of the image vectors change from frame to frame in a probabilistic way to assist in matching. The process of generating image vectors for every frame or every nth frame may come up with false positives. However, the tracking system makes the same type of frame identification mistakes that a human would make in mistakenly recognizing one image for another when they are very similar in appearance.

In accordance with at least one embodiment of the invention, the image vector technology may be enhanced to: 1) be able to work over multiple frames and 2) be able to further compact the image vector data (so that the tracking system does not simply utilize a succession of image vectors); and 3) map the trends of these vectors over time. Thus, although video recognition can be accomplished by generating an image vector for each frame of a video, this is inefficient and may not be commercially feasible on a large scale because this approach generates too much data, requires too much time and processing power and is not necessary for effective identification of tracked video files.

There are many ways of compacting the amount of data utilized in the video recognition process. For example, one way of compacting the amount of data is to use subsampling as mentioned above. Generally, each image vector can be subsampled to make each image vector smaller, or the generated stream of image vectors could be subsampled, or both. Subsampling and other methods for reducing the amount of data generated during the fingerprinting process is necessary because even though the image vectors are individually represented by a small amount of data, for an entire movie (or other video source with long run time), the amount of image vector data becomes relatively large.

In another procedure for reducing the amount of data generated by the stream of image vectors, as the image vectors are generated for a series of movie frames, the image vectors are analyzed to determine vector trends over time. Analyzing trends of the image vectors has many advantages including that it can be used to reduce the total amount of data required to identify a movie. Also, it makes possible movie identification without downloading the entire movie. The series of frames may be sub-sampled in time so that rather than generating an image vector for every single frame of a movie, every $n^{th}$ frame is sampled.

As another way of reducing the amount of the data generated by the stream of image vectors, the "resolution" of each image vector may be reduced by decreasing the size of the warp grid used to generated the vectors.

EXAMPLE 3

Identifier Utilizing "Up-Down" Coding For Audio Files

The media tracking system is also capable of generating a media file identifier for each protected or "known" media file or each target or "unknown" media file containing music. The tracked media file identifiers can be stored in the database and the database can be searched for a match with a "query" or target media file identifier. This process may be used, for example, to determine whether or not a copyrighted or otherwise protected music file is being offered without permission for distribution or play on the Internet. An example of an identifier generating algorithm for generating identifiers for music-containing audio files (referred to hereafter as "audio files") may use a technique called "up-down coding".

The up-down coding technique takes advantage of the fact that digitally encoded audio data is essentially a sequence of samples (represented by binary numbers), which represent the loudness of the recorded sound. There are many sampling rates and bit resolutions for encoding digital audio, which differ from one another in the number of samples of the audio signal taken per second and in the number of discrete levels used to represent the sound level at each sample.

Music files are available on the Internet as streaming audio and as downloadable files that can be stored for later play and/or redistributed. As a specific example of an audio file format, a typical commercial audio Compact Discs ("CDs") is encoded using 44,100 samples per second and each sample is represented by a 16-bit value which indicates the amplitude or loudness of the sound of that particular sample. Digital Audio Tape (DAT) uses 48,000 samples per second and a 16-, 20-, or 24-bit sample resolution. Lower fidelity encoding schemes are also prevalent. Some Internet-based digital radio standards use 32,000 samples per second and have resolutions of 8 or 16 bits, depending on what level of fidelity required. These file formats use Pulse Code Modulation (PCM) to encode the audio.

The up-down coding technique of file recognition calculates the energy level within a particular waveform to find the relative amplitude peaks of the waveform. In the time domain, a digital audio signal is represented by a series of amplitudes. The algorithm traces all of the peaks of the audio signal at a fairly low resolution (i.e., sampling rate) but at a resolution that is high enough to track changes that indicate the melody of a song. A four milli-second resolution, for example, is fast enough to be able to track the melody of a song.

At each peak, the dominant frequency is calculated. The dominant frequencies at the relative peaks are taken to represent the melody note that is being played at that point in the music. It does not matter if multiple notes are being played at each peak because the technique determines the dominant frequency where "dominant" refers to the frequency having the greatest energy. The dominant frequency at each relative peak is "plotted", in effect, so that the up-down coding algorithm is able to determine the relative change in frequency from one relative peak to the next relative peak in time. Stated another way, the up-down coding algorithm determines whether each note goes up or down in frequency from peak to peak. The transition from one note to the next is encoded as a binary 1 if the note goes up in frequency and is encoded as a zero if it goes down in frequency. Thus, the algorithm produces a succession of ones and zeros that indicate whether the melody goes up or down from note to note. This sequence of zeros and ones comprises a unique media file identifier that can be stored in a database and searched against to identify the song. However, for many commercial applications, this sequence of zeros and ones (hereafter referred to as the "code" of the identifier) is too long to be used as a database key. For an average length song of three to five minutes, the identifier code sequence may require up to 100 KB of storage space.

To compress the up-down coded media file identifier, a compression technique such as run length encoding may be used to save storage space.

One alternative way to decrease the storage space required for the identifier code of each audio file may be to generate up-down coding for only a portion of an audio file as, for example, for the chorus of the song. A person pirating a song may be unlikely to remove or alter the chorus from the song even if the pirate were to alter the song file in some way to prevent detection of the file as containing an unauthorized duplicate of a protected song.

Rather than up-down coding only a portion of a song, the up-down coded media file identifier may be generated from an entire song in the media file and the media file identifier may then be further compressed by a data compression technique such as run length encoding before being used as a media file identifier. Run length encoding compresses the sequence of zero's and one's into a smaller, more manageable number of bytes. After run length encoding, each media file identifier may be further processed to identify cyclical patterns in the identifier. Cyclical patterns are likely to occur because portions of the melody of the song are typically repeated. The cyclical patterns may optionally be used as the basis for further data compression. Finally, Hoffman coding can be applied to further compress the identifier to place a up-down coded identifier in its final up-down coded form.

Media Tracking Systems

One or more identifier generating algorithms can be incorporated into a media tracking system for finding and identifying media files. Media tracking systems can be adapted for many uses including cataloging a large collection of media files, tracking or measuring distribution of particular media files on a network and tracking and recording instances of unauthorized file duplication (i.e., copyright violations) on, for example, a single computer or on a computer network. An exemplary embodiment of a media tracking system is given immediately below. This example illustrates the use of the media tracking system to detect and record instances of media files on the Internet.

Figure 10:
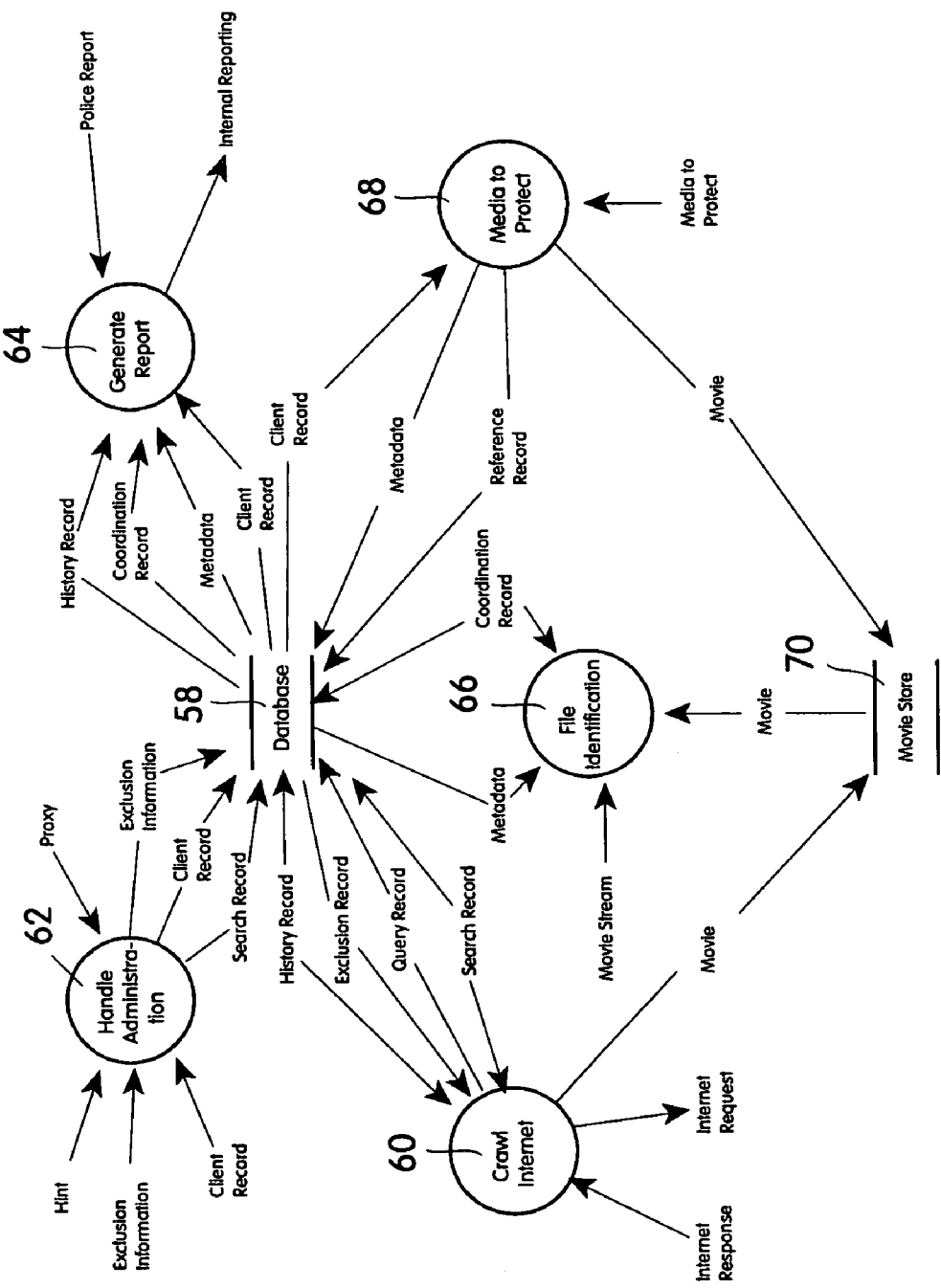
FIG. 10 is a decomposed view of the media tracking system of FIG. 9 in Yourdon notation showing a database of the system, a plurality of processes performed by the system and indicating data flows therebetween.
Figure 11:
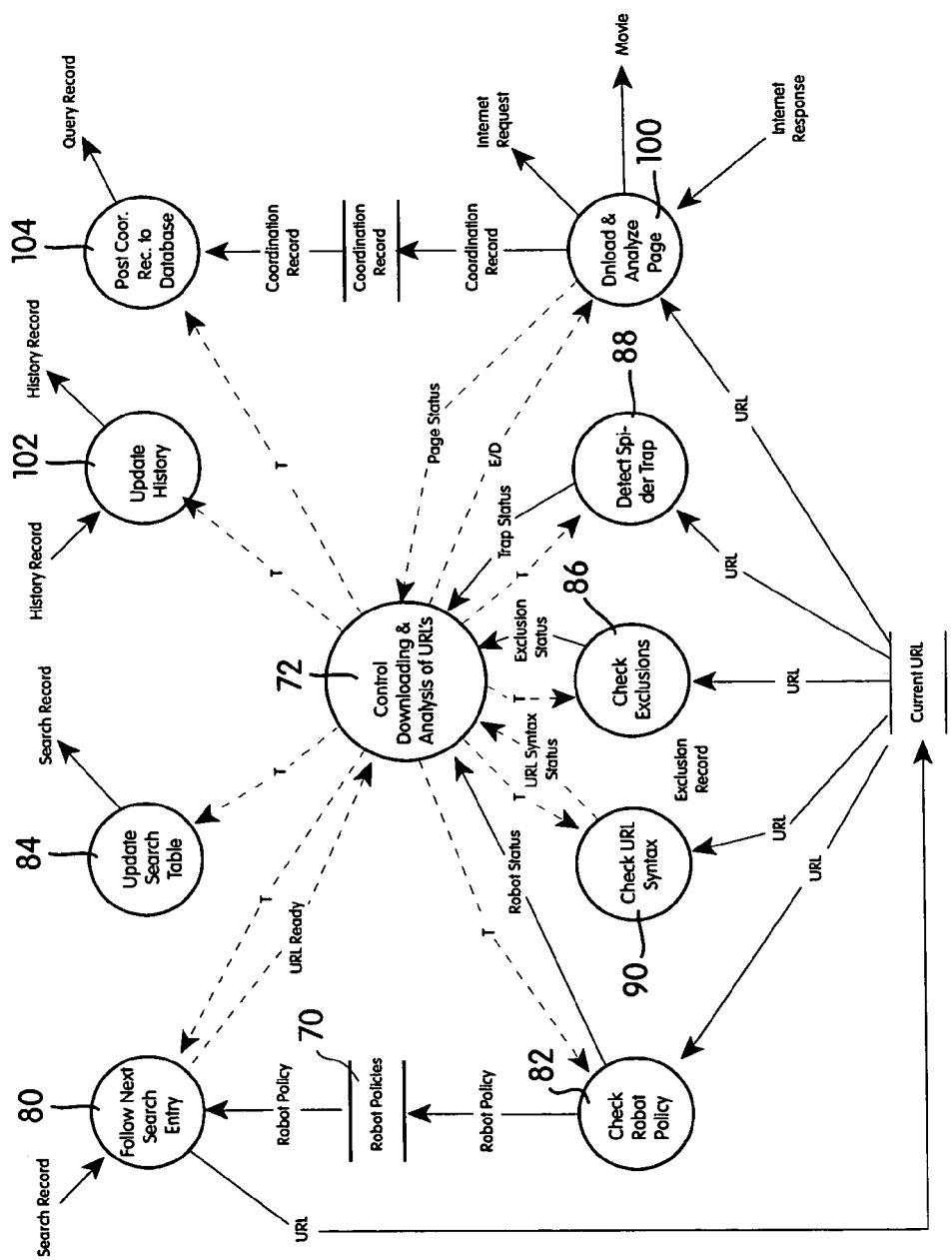
FIG. 11 is a decomposed view of a plurality of processes performed by an Internet crawler of the media tracking system in Yourdon notation and indicating data flow therebetween.
Figure 12:
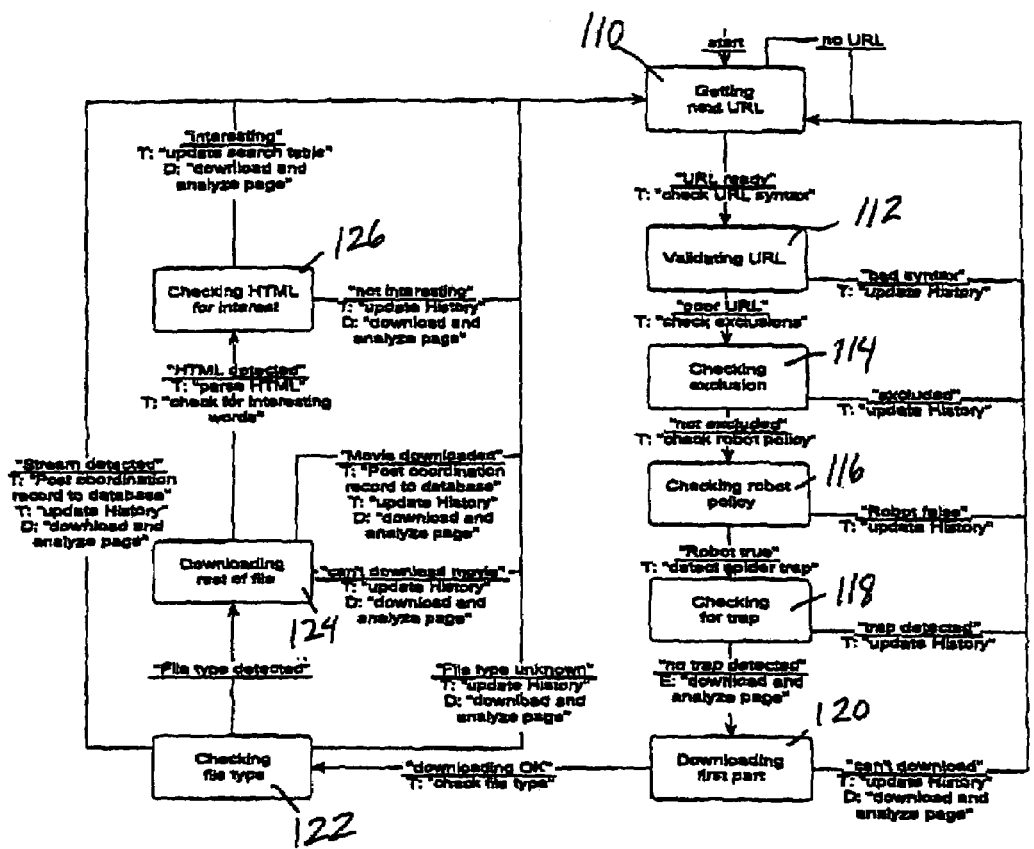
FIG. 12 is a state transition diagram decomposed from FIG. 11 of the Internet crawler of the system.

A media tracking system 50 according to the invention and portions of the environment in which the system 50 operates are shown in FIGS. 9–14. FIGS. 9–11, 13 and 14 show the tracking system 50 and its operating environment in a hierarchy of Yourdon data flow diagrams. In Yourdon notation, solid circles represent processes, dashed circles represent control processes, solid lines represent operations processes and dashed lines represent control operations. Persons and computer networks interacting with the tracking system 50 (directly or indirectly) are represented by rectangles in FIG. 9. FIG. 12 shows a state transition diagram for the web crawling portion of the tracking system 50. The various states of the crawler portion are represented by solid rectangles having rounded corners in FIG. 12.

Figure 9:
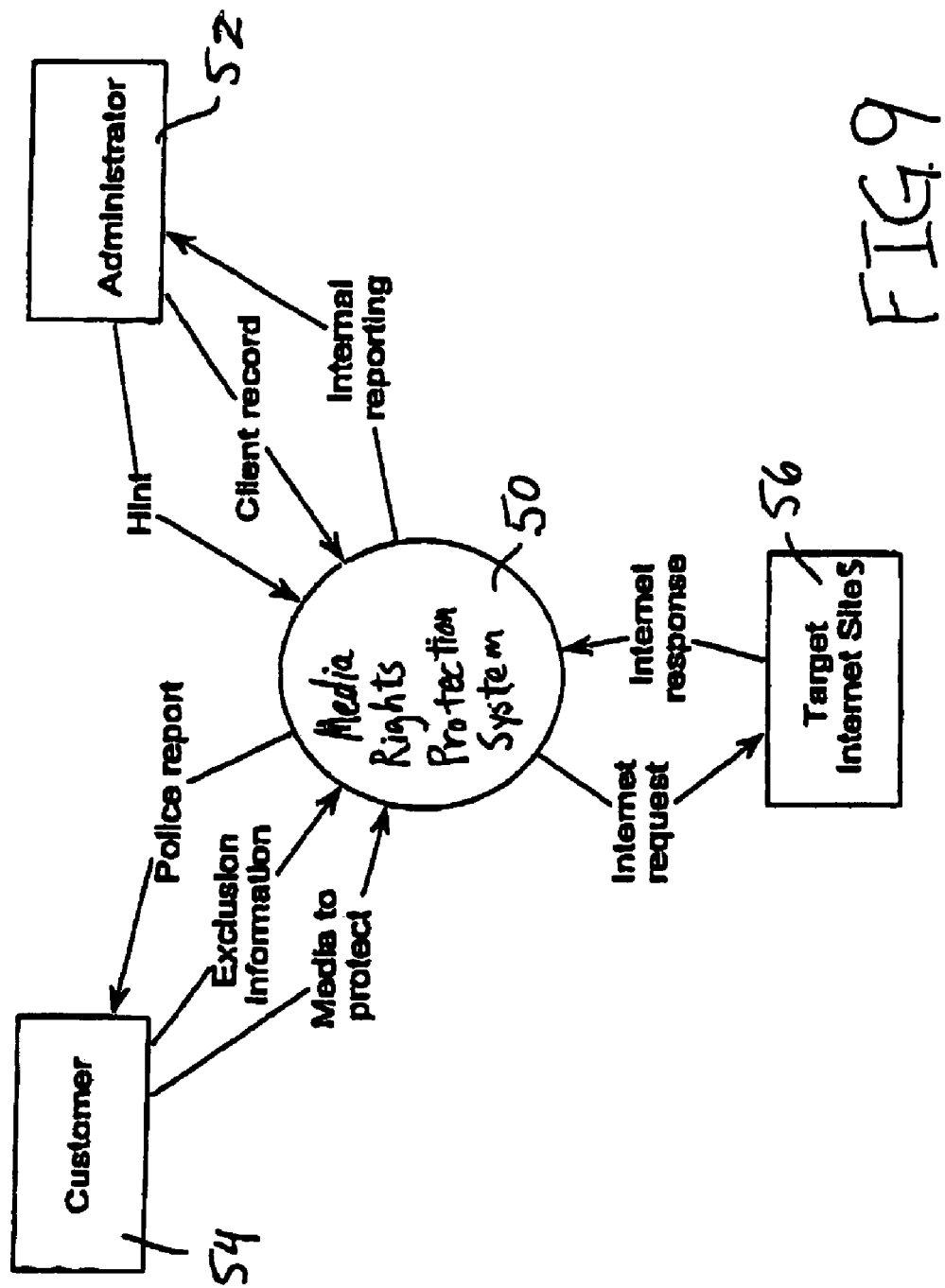
FIG. 9 is a schematic diagram in Yourdon notation showing a media tracking system in an operating environment thereof.

FIG. 9 shows a broad overview of the general context or environment in which the tracking system 50 operates. The environment includes a network administrator 52, tracking system customers 54 and the Internet 56.

Generally, a customer 54 is any media content provider having rights in media property that need to be tracked. A customer could be, for example, a movie studio, a television broadcaster, an Internet pay-TV operator or a record company. Protectable content includes digitally encoded audio and/or image (i.e., still image or video) files (hereafter referred to collectively as "media files" or "media content"). Anyone having protectable rights in media content who is concerned about managing and tracking dissemination of copies being played and/or redistributed without permission on the Internet is a potential customer for the tracking system 50.

The tracking system 50 is capable of detecting and tracking media file instances on any type of site on the Internet 56 (assuming the system 50 has access thereto), including, but not limited to, such sites as commercial and non-commercial network presences, e.g., web sites, FTP sites, newsgroups and the like. To facilitate description of the invention, these various types of sites are referred to collectively either as "network presences". The administrator 52 monitors and controls the tracking system 50.

In FIG. 9, directional arrows indicate the flow of information (i.e., data) between the system 50 and the administrator 52, the customer 54 and the Internet 56. Generally, a customer 54 provides media files to be tracked (tracked media files are also referred to a "known" media files) and exclusion information for use by the system 50. A media file identifier is created for each protected or known media file (also referred to as a "known" media file identifier) by analyzing each known file with an appropriate identifier generating algorithm. Each known media file identifier and the media metadata therefor (indicating the title, owner, and so on of the known media file) are stored in the database of the system and are associated with each other so that the metadata can be retrieved to identify the name of the file from which the associated media file identifier was derived. The fingerprints and metadata may be extracted by the system 50 by having the customer 54 provide a copy of each media file to the system 50. Alternatively, extraction of fingerprints and metadata can take place on a customer's premises if the customer 54 does not want to release a digital copy of the tracked media.

The group of computer executable algorithms that extract the fingerprints are generally referred to as "recognition software utilities" and include programs that include identifier generating algorithms for extracting and compressing media file identifiers based on image vectors, word count, up-down encoding over similar type recognition criteria. The algorithms used to create these various types of identifiers are collectively (and generically) referred to as "identifier generating algorithms", examples of which were explained above. Preferably, these recognition software utilities are stand-alone programs so that customers 54 who do not want outside entities (including the system 50 or the administrator 52) to have access to their media files are able to generate recognition data and metadata themselves at the discretion of the administrator 52.

Exclusion information is also provided to the system 50 by each customer 54. Exclusion information is information that identifies third parties that have copies of the tracked media by permission. Exclusion information can include, for example Universal Resource Locators ("URLs") of permitted content providers.

As explained in greater detail below, the system 50 includes a web crawler which searches the Internet for protected media files. The network presences which have permission (which is determined from the exclusion information) to use tracked media files are referred to as "excluded network presences" and may or may not be searched. Generally, the system 50 fingerprints each unknown media file located on non-excluded network presences (a target media files is interchangeably referred to as an "unknown media file") and compares the fingerprints of the unknown or target media files against fingerprints of tracked media files in the database of the system 50. The general tracking activity of the system 50 is periodically reported to the customer 52 in a report. This report may be produced by the system for a customer which indicates how thoroughly the Internet was searched for tracked media files and which lists discovered instances and the location and degree of those instances. The list of instances may include, for example, evidence which may enable the customer to enforce its intellectual property rights, determine royalty payments, determine market penetration, etc.

The administrator 52 provides the system 50 with customer records which are stored in the database of the system 50. Each customer record contains all customer information to be held in the system 50 database relating to a particular customer. The administrator 52 may provide the system 50 with "hints" as to where to search for media during the web crawling process. Hints may seed the crawler's search and include any information that may help the crawler to locate tracked media files. Hints may include, for example, URLs of known clients or customers of the customer, suspected pirate network presences, names of newsgroups to search, keywords to look for, and so on. The system 50 is capable of generating internal reports for use by the administrators. The system may be programmed so that each internal report summarizes any desired information including a listing of the data stored in the database, lists of network presences searched and search results. This information may be broken down by customer, for example.

A target site may be a network presence of any type to be searched by the crawler. During the search, an attempt is made to discover media files that contain unauthorized copies of tracked media content and to generate information (e.g., new URLs to be searched) that may be used by the crawler to locate other potential intsrances of the media files on other network presences. During the web searching process, Internet requests are sent to the target network presence and Internet responses are received from the target network presence. A wide range of Internet protocols may be supported by the system 50, including HTTP and FTP. Similarly, a wide range of media storage and streaming protocols may be supported by the system. Supported storage protocols may include video and audio formats such as those listed above and streaming protocols such as RTSP and MMS.

FIG. 10 shows details of the data flow diagram within the system 50. The system 50 includes a central database 58 that links a crawler process 60, administrative front end processes 62, 64 and data recognition processes 66, 68. The front end processes 62, 64 are application software interfaces through which the administrator interacts with the media tracking system database 58, controls the operation of the system 50 and controls generation of reports.

The process 62 is the process through which the administrator 52 enters information into and administers the system 50. The administrator 52 enters client information, hints, exclusion information and proxy information through the front end process 62. As described below, proxy information tells the crawler which proxies are available through which it can access the Internet. The front end process 62 generates exclusion records (from the exclusion information), customer records and search record information (including any hints provided by the administrator 50) for storage in the database 58. The front end process 62 generates a customer record, an exclusion record and a search record for each customer. The front end process 62 includes a monitoring portion or program which allows the progress of the crawler and the state of all components to be monitored and inspected at any given instant in time or for any given time interval. The monitor portion of the front end process allows the administrator to identify performance "bottlenecks" and other performance problems of the tracking system. The purpose and content of proxy information entered into the system 50 through the front end process 62 is described in greater detail below, but generally provides the system 50 with information about the web addresses through which the system 50 may search the Internet.

The process 64 is generally the software interface through which the administrator 52 and customers 54 receive output information from the system 50. Generally, the process 62 reads history records, coordination records, movie metadata records and customer records from the database 58 and generates the reports for the customer 54 and internal reports for the administrator 52.

The information flow between the central database 58 and the crawler 60 includes history records, exclusion records, query records and search records. The system administrator 52 is configured to start and stop the operation of the web crawler 60. The crawler 60 is the software interface between the system 50 and the Internet 56 (not shown in FIG. 10). The hardware interface between the tracking system 50 and the Internet 56 is the plurality of proxies, which provide a plurality of Internet addresses through which the Internet is accessed and searched. The crawler 60 communicates with the Internet by sending Internet requests and receiving Internet responses. As considered below, the crawler 60 is preferably realized by a massively distributed computer network and interfaces with the Internet through a large number of Internet addresses. After the administrator starts the crawler 60, the crawler 60 searches the Internet 56 automatically by accessing the information stored in the database 58 to control its operation. The progress of the crawler 60 is periodically logged in the database 58.

The file recognition processes may include a media input process or "engine" 68 for generating and recording file recognition data (e.g., known media file identifiers created from the known media files provided by the customer) for the customer files to be protected and a recognition application process or "engine" 66 for extracting recognition data from target files discovered by the crawler 60. Fingerprinting may be performed as a separate application independent of the web crawling process. The coordination record in the database may assist in directing the recognition process 66. The process 66 may extract image vectors, word counts, up-down coded data or other types of data used to create media file identifiers from media files and may be configured to search metadata in database 58 for previously stored data.

When the crawler process 60 finds a target media file (on a non-excluded network presence, for example) to be checked, the crawler 60 communicates the data stream from the target file to recognition process 66. The recognition process 66 implements the appropriate identifier generating algorithm from among the recognition software utilities. The crawler 60 can download and store a media file at a storage site 70 within the system 50 or can send a stream of media content (from a streaming media file, for example, that is being "played") directly to the process 66. The recognition process 66 fingerprints all or a portion of the target media file and queries the database 58 for fingerprint matches with fingerprints of tracked media files stored in the database 58. The process 66 communicates with the database 58 through coordination records.

The recognition process 68 is the system interface which receives the media to be protected from the customers. Recognition process 68 can accept fingerprints and associated metadata extracted from tracked media files by the customer 54 and/or can accept the tracked media files themselves from the customer. When the recognition process 68 receives the media files from the customer, the process 68 temporarily stores each media file at storage site 70 which triggers the recognition process 68 to begin the process of extracting fingerprints from the protected file in storage site 70.

The operation of the crawler 60 may be better understood from FIGS. 11 and 12. The crawler 60 generally may perform a "crawl Internet" process which can, in turn, be decomposed into the group of related processes shown in FIG. 11. The basic functions of the crawl Internet process include: 1) guided Internet crawling through the guidance of a search table that is stored in the central database 58 and which is sorted by level of interest; 2) checking each searched URL for syntax and exclusions and checking each site searched for crawler traps; 3) analyzing each web page or network presence to find search hints and media files and downloading any media files located on the target site; and 4) updating the central database 58. Each of these four functions is accomplished by one or more of the processes performed by the crawler 60.

FIG. 12 is a crawler control state transition diagram decomposed from FIG. 11. The crawler process 60 is realized by the collection of processes 80–104 of FIG. 11 and these processes of FIG. 11 are driven and controlled by a control downloading and analysis of URL process 72. The logic of control process 72 is described in FIG. 12 and will be described first.

Control process 72 begins by getting a first (or next) URL 110 from database 58 by reading a record in a search table in the database 58. The search table lists Internet links (sorted by level of interest) to documents and/or data and indicating the level of interest in each link. A "link" is a general term for an Internet address. The data or document associated with an Internet link can include, for example, an individual web page or a directory of files on an FTP site. Each page in a network presence may have its own link. Many network presences also provide links to other network presences which contain related content. For example, music network presences often have links to other music network presences. The level of interest in a particular link in this context is generally a measure of the likelihood that a particular site pointed to by the link contains tracked media files. The greater this likelihood, the higher the level of interest.

The level of interest in a particular link can be determined in many ways. The administrator 52 can enter a level of interest into the system 50 when the administrator enters a link as a hint. The crawler 60 can locate links and determine their relative interest level on its own. This can be accomplished by automated searching of a document identified by the link for predetermined keywords. For example, a document pointed to by a link may be a web page written using hypertext transfer protocol (HTTP). This document can be searched for keywords and may have a higher level of interest if it contains text (i.e., keywords) relevant to movie or music production or distribution. The control process 72 reads the record in the database 58 that contains the link that has the highest level of interest. If there is no link record available, crawler process 72 remains in the getting next URL state waiting for a URL. Once crawler 60 receives a link to search, the "URL ready" condition is met that causes the state of the crawler 60 to initiate a "check URL syntax" routine and the process 72 moves into a "validating URL" state.

The change of state of the control process 72 from the "getting the next URL" state 110 to the "validating the URL"

state 112 may be indicated by a directional arrow. Each directional arrow between states may be labeled to indicate the condition (or conditions) under which the process 72 transitions from one state to the next and the action taken when a state transition occurs. More specifically, the transition from state 110 to state 112 occurs on the condition that a URL is ready, meaning that a URL has been fetched from the Search Table and is ready to be processed. The action taken by the control process 72 when it transitions from one state to its next state is indicated by the letter "T" and is written below a horizontal line separating statements which label each directional arrow. Thus, the action taken by the process 72 when transitioning from state 110 to state 112 is to check the link or syntax of the URL.

When the control process 72 is in its "Validating URL" state 112, the URL is checked for valid syntax. If the URL is not valid, the History Table is updated with a "bad syntax" error message and with the corresponding bad URL and crawler process 72 returns to its "Getting Next URL" state 110. If the syntax is valid, the system initiates and transitions into a "Checking Exclusions" state 114.

In the Checking Exclusion state 114, the URL is checked to determine if it matches an entry in an Exclusion Table stored in the database 58. The Exclusion Table includes a list of URLs that have and distribute the media files with the permission of the media owner. The Exclusion Table typically also includes other network presences that the crawler 60 is not going to browse. The URLs in the Exclusion Table are typically provided by the media owner. If the URL being processed matches a URL on the exclusion list, the process 72 returns to the "Getting Next URL" state. If no match is found with a listing on the Exclusion Table, the process 72 initiates and transitions into the "Checking Robot Policy" state 116.

Most network presences include a robot.txt file which contains a request to web crawlers and other search engines on how to search that particular network presence. The process 72 checks to see if a robot policy has been previously downloaded for the particular site being accessed by searching a Robot Policies table. If there is no matching entry in the Robot Policies table, this indicates that this is the first document downloaded from the particular target network presence. The process 72 then downloads the robot.txt file and updates the Robot Policies table with the information.

If the robot.txt file denies access to the crawler 60, the control process 72 consults a "policy" field in a Client Table for the client whose tracked media is currently being search for. A number of possible values can be stored in this field including "obey", "stealth", and "ignore". If "obey" is contained in the policy field of the Client Table, crawler 60 obeys the policy stated in the robot.txt file and the process 72 returns to the "Getting Next URL" state. If the customer has a "stealth" policy indicated in the policy field, crawler 60 attempts to disguise its presence by mimicking a human user (by, for example, using its proxies in a manner considered in detail below) and proceeds to the "Checking for Trap" state in preparation to search the target network presence for media files and links. Similarly, if "ignore" is the policy value in the Client Table, crawler process 72 moves into the "Checking for Trap" state 118. The process 72 also moves into the "Checking for. Trap" state if the robot.txt file allows access to crawlers or if no robot policy is established for the particular target network presence.

Generally, a trap is a procedure or program used by a target network presence to prevent a crawler from successfully searching the site and/or to waste substantial time and resources of the system 50 when crawling the Internet. There are many types of traps. Some traps cause the crawler 60 to search endlessly among a set of recursive links which point to each other. Other traps continually generate dialog boxes or other pop-up messages. Other traps serve an endless stream of dynamically generated web pages. When the crawler 60 accesses a network presence, the process 72 first consults crawler a History Table in database 50 to check to see if a trap has been detected on the particular network presence during a previous search. Each time a web page is accessed at a particular target network presence, the address of the page is recorded in the History Table. Loops (as may be generated when the crawler 60 encounters a recursive link-type trap) can then be detected by consulting the crawler History Table to see if a link has been visited recently. If a trap is detected, the crawler updates the History Table to indicate the presence of the trap and the process 72 returns to the "Getting Next URL" state 110.

If no trap is detected (i.e., if the "no trap detected" condition is true), the "Downloads and Analyze Page" action is enabled and the process 72 transitions into the "Downloading First Part" state 120. "Enable" and "Disable" are represented in FIG. 4 by "E" and "D", respectively.

When in the "downloading first part" state 120, the process 72 attempts to download and analyze the first part of the web page pointed to by the URL (that is, the link). If the first part of the page is able to be downloaded, the process 72 begins the download and transitions to the "Checking File Type" state 122. If the first part of the file is not able to be downloaded, the process 72 updates the History Table in the database 50 and disables the "download and analyze page" action. The crawler 60 can fail to download the first part of a page for a number of reasons. For example, if the host (where "host" refers to the server providing the network presence pointed to by the URL) does not exist or if the network connection to the page is down, the page will not download. If the network connection is down, the crawler 60 attempts to download the page for a predetermined maximum time (which can be set by the administrator). If a failure to connect occurs, the crawler 60 may update the History Table and the process 72 returns to the "Getting Next URL" state 110.

If the first part of a page is downloaded successfully (for example, if the page may be written in HTTP protocol and the HTTP header may be downloaded), the process 72 may transition into the "Checking file type" state 122 and may analyze the file containing that page to determine what type of file it is. The file type cannot always be determined from the file extension because sometimes the file extension is changed. Thus, the file type is either determined from the file extension or from the information in the first "n" bytes of the file, or both. If the file type is invalid or unknown, or if crawler 60 may determine that the site is to be ignored, the crawler 60 may update the History Table, disable the "download and analyze page" action and crawler process 72 may return to the "Getting Next URL" state 110.

If the detected file type is valid, the system 50 does one of two things depending upon whether the file is a static format file or is a streaming format file. If the file is in a static format, the process 72 may transition into the "Downloading Rest of File" state 124. A static format file of interest may be an HTML file or may be a file containing media to be analyzed for tracked content. If the file to be downloaded is a video in static format, the process 72 may post a coordination record to the database 58, update the History Table to identify that particular URL as containing a media file of interest and disable the "download and analyze page" action of the process 72. When the crawler 60 updates or posts the Coordination Record in the database 58, the crawler 60 may identify the static movie format media file and its address. This event triggers a call to crawler file recognition process 66. The process 72 then transitions back to the "Getting Next URL" state 110. If the static media file cannot be downloaded (because of a timeout error or some other error), the process 72 updates the History Table to indicate that this failure event has occurred against a particular URL, the download and analyze page action is disabled and the crawler 60 transitions back to the getting next URL state 110.

If the document is in a streaming format, crawler process 72 may disable the "download and analyze page action, update the History Table and post a coordination record in the database 58 to identify the streaming media and its URL. Each update to the Coordination Record may trigger a call to the process 66 (which functions as the stream-decoding engine) and the process 72 may return to the "Getting Next URL" state 110.

If the document is downloaded successfully and is determined to be in HTML format, the process 72 may initiate a "parse HTML" action and a "check for interesting words" action and may transition into crawler "Checking HTML for interest" state 126. In the "Checking HTML for interest" state 126, the crawler may parse the HTML document to find text (i.e., key words and phrases) and links of interest. Links of interest that are discovered may be added to the Search Table.

The crawler 60 can determine the interest level or relevance of text and links in several ways. For example, key words and phrases found in the text may be compared with key words and phrases listed in the Interest Table. A particular link found on a web page may be deemed to be of interest by comparing other links listed on that same web page with link addresses listed in the History Table.

If there are no links on a particular page, the crawler may update the History Table and decrease the level of interest for that page in the History Table. The process 72 may then return to the "Getting Next URL" state 110. If any links are found on a particular web page, these links may be added to the crawler Search Table along with indicia indicating an estimate of interest level in each link, the History Table may be updated, and the process may return to the "Getting Next URL" state.

The operation of the Internet crawling process 72 described in FIG. 12 is summarized in FIG. 11. The relationship between the crawler 60 processes 80–104 and the functions performed by the crawler 60 are shown in FIG. 11. The function of crawling the Internet according to a search table sorted in order of interest may be generally carried out by the "follow next search entry" process 80 and the "update search table" process 84. The crawler 60 function of checking each link for proper syntax, exclusions and traps may be generally carried out by the "check exclusions" process 86, the "detect trap" process 88, the "check URL syntax" process 90 and the "check robot policy" process 82.

The crawler function of analyzing each page and downloading media files is carried out by the "download and analyze page" process 100. The updating of the database 58 function may be carried out by the "update search table" process 84, the "update history" process 102 and the "post coordination record to database" process 104. Crawler process 80 reads the search record in the database 58 and provides the current URL which is in turn provided to processes 82, 86, 88, 90 and 100. The process 72 can apply a trigger "T" to call any of the process 80–104. For example, the "post coordination record to database" process 104 can be triggered to post the coordination record to the database 58, process 72 can enable/disable the check link process by triggering processes 82, 86, 88, and 90. The process 72 can enable/disable the downloaded and analyze page process by triggering process 100.

As mentioned above, when the crawler 60 updates or posts the Coordination Record in the database 58 identifying a static movie format media file and its address or identifying streaming media and its address, these events trigger the recognition engine 66 download and analyze the media files indicated. The action of the recognition engine or process 66 is decomposed and summarized in FIGS. 13 and 14. The basic procedures followed when fingerprinting a targeted media containing video or audio using either the image vector technique, word count or up-down encoding are similar and are illustrated using a movie file and the image vector technique in FIGS. 13 and 14.

Figure 13:
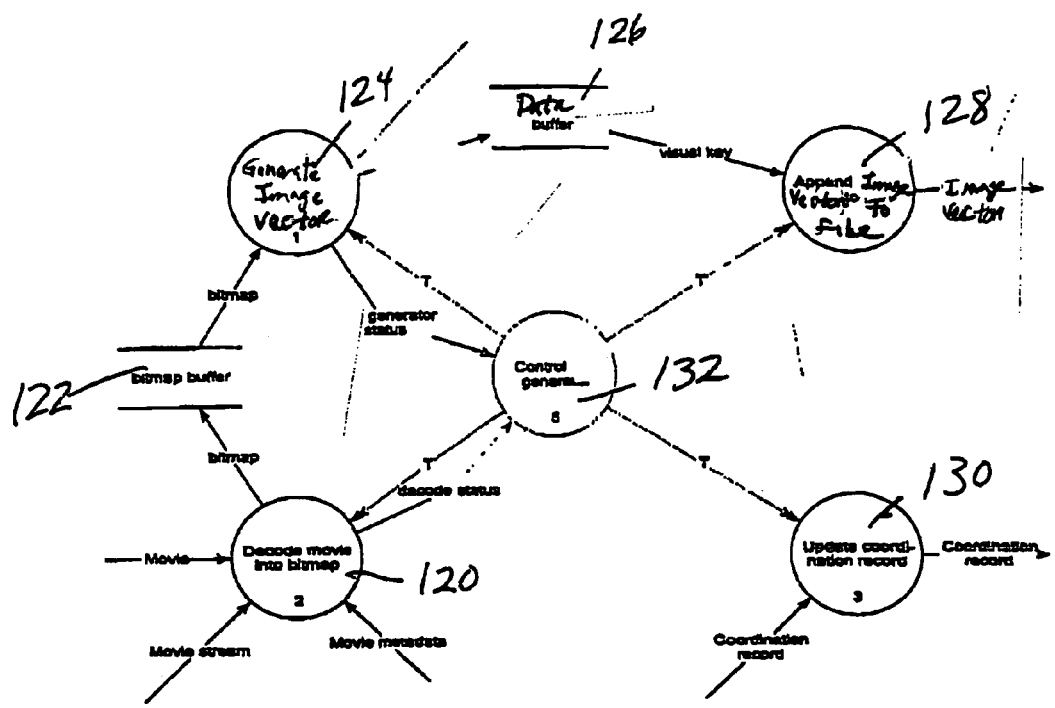
FIG. 13 is a schematic diagram in Yourdon notation showing a plurality of processes for generating image vectors from a series of images of a video.

FIG. 13 shows the procedures for generating image vectors from either a protected movie file or a target movie file. The movie file may be provided to a "decode movie into bitmap" process 120 as a static file or as streaming video. Process 120 decodes the movie and extracts each selected frame (every frame or every nth frame, for example) as a bitmap image. Each bitmap image may be stored in a memory buffer 122 and pixel data is extracted from the bitmap image by an image vector generating process 124 which derives an image vector for each selected frame. As each image vector is generated, it is stored in a data buffer 126. The image vectors stored in the buffer 126 can be analyzed as they are generated to detect vector trends or they can be stored in their entirety before being further compressed, subsampled or otherwise processed. The image vectors in the buffer 126 can be appended to a file by process 128 for storage in the database 58. The file containing the image vectors for each movie may also contain other data, e.g., metadata. After the image vectors are extracted from the movie file, the coordination record may be updated by process 130 to indicate that the movie has been fingerprinted. The decoding and fingerprinting process may be controlled by a control generator process 132.

Figure 14:
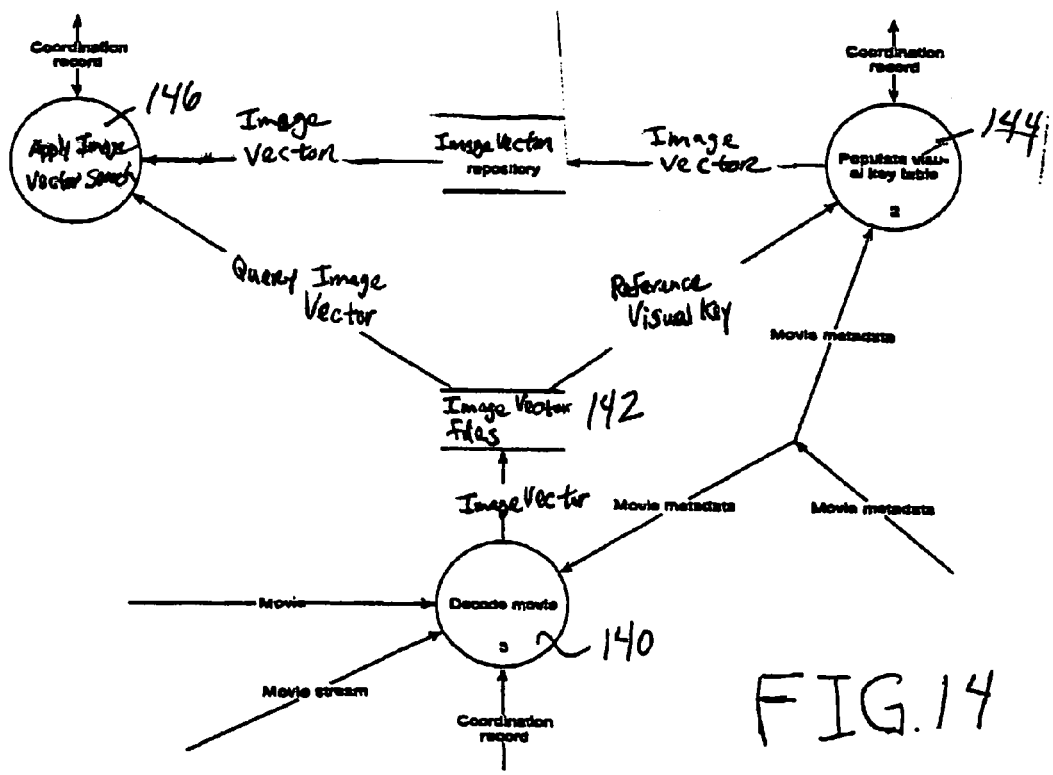
FIG. 14 is a schematic diagram in Yourdon notation showing a plurality of processes for generating a series of image vectors from a series of frames of a video, for storing selected series of image vectors in a database and for querying the database with other series of image vectors.

A general procedure for generating image vectors for storage (from protected file) or for querying the database 58 with image vectors from target files against the image vectors of protected files is illustrated in FIG. 14. Movie files in either static or streaming format are provided to the movie decoding process 140. The movie decoding process 140 can be triggered by the change in the coordination record or as a result of a tracked media file being put into the system 50 by the administrator. The decoding process 140 may generate image vector files 142, which may be either stored in the database 58 as reference image vector files (in the case of protected files) or used to query the database (in the case of target files). The reference image vectors may be indexed in a table of the image vectors by an image vector table populated process 144. The process 144 may associate the reference image vectors with movie metadata. During a query of the database 58 using any image vector generated from the target file, reference image vectors in the database may be fetched from an image vector repository within the database 58 and an image vector search process 146 may compare the queried image vector with the reference image vector. If a match is found, the address of the network presence containing the targeted media file may be recorded and reported to the media file owner as described above.

It should be appreciated that the crawler 60 may be implemented by a highly distributed computer network and may be programmed to mimic the behavior of a human user searching the Internet using a browser such as Internet Explorer. Some network presences that pirate media files are very sophisticated in their ability to detect Internet crawlers, robots and spiders. Because the crawler 60 is implemented on a widely distributed computer network, preferably on several dozen computers, which may all be accessing the Internet simultaneously from different web addresses, the crawler 60 is highly multithreaded. If a pirating network presence does not allow searching of the site by a crawler, it is important to prevent the target network presence from detecting that it is being searched by a crawler. If a particular target network presence detects that it is being searched by a crawler, the target network presence may respond by recording the crawler IP address (where IP stands for "Internet Protocol") of the crawler and placing that IP address on the list that would block future access of that site by the crawler from the same address. IP addresses are difficult and expensive to change. Consequently, it may be desirable that the crawler 60 not be detected as being an automated program by any target network presence.

An important feature of the crawler 60, then, is that it can conduct automated web searches stealthily so as not to be detected as being an automated program, even by network presences having policy against crawlers. To understand the stealth features employed by the crawler 60, it is necessary to understand the ways in which robots, crawlers and other automated programs are detected by site administrators operating pirating sites (these administrators being referred to as "pirates" hereafter) operating target network presences.

Pirates are typically very skilled at detecting attempts by crawlers to search their network presences. For example, to detect robots, some network presences monitor all accesses to their network presences. This monitoring may include recording the address and searching behavior of each entity accessing the network presence. The monitoring of the searching behavior can include noting the links on the network presence that are accessed by an entity having a particular IP address, the speed with which the links are accessed and the order in which the links are accessed. A human accessing a network presence generally navigates the network presence relatively slowly, typically clicking on a new link within that network presence every few seconds at most. Furthermore, a human using an Internet browser generally does not follow the links of a particular network presence systematically. In contrast, a robot or other automated web searching program is often capable of navigating through a particular network presence in a few seconds and can be programmed to do so in a thorough and methodical manner. Furthermore, typical robots search an entire network presence from a single IP address. These behaviors of typical robots are all susceptible to detection by the network presence which can result in the preclusion of further attempts to search the target site by the robot because the robot's address is blocked.

The present crawler 60 may avoid detection by target network presences by mimicking the behavior of an individual "surfing" the Internet. The crawler 60 may accomplish this by running the crawler 60 on multiple threads so that multiple instances of the crawler 60 can simultaneously access and follow various links within a particular target network presence at a web page navigation speed comparable to that of a human. More particularly, when the crawler 60 searches a network presence, the crawler may access that target network presence using several computers simultaneously, each computer having its own distinct IP address, thereby simulating a number of different human users. To accomplish this simultaneous access of a single target network presence by the crawler using several computers, a distributed proxy system is included in the crawler 60.

A "proxy" may be any device that provides a way of accessing the Internet from a single IP address the appears to the destination (i.e., the target network presence) as coming from multiple IP addresses. One way in which a proxy may be implemented is to utilize a computer that has several network interface cards installed. Each network card may have its own IP address. The crawler 60 can then access the Internet through a single Internet connection having a single Internet address yet, because the crawler may access the Internet through using a proxy comprised of several network interface cards, the proxy translates the IP address to another IP address so that to the target it appears as though each proxy has a different IP address.

In accordance with at least one embodiment of the invention, the crawler 60 may use proxies that are distributed around the United States (or another country of operation, or the world) to access a particular target network presence. Thus, the crawler 60 may be located in a central location yet is able to access the Internet through several hundred of these proxies throughout the United States. Therefore, it would appear to a single target network presence as though it is being accessed by several different IP addresses. It is also contemplated to periodically rotate these IP addresses, thereby making monitoring even more difficult for a network presence to detect.

It is important that a particular target network presence not be repeatedly accessed in the same manner from the same IP address. To prevent this from happening, logs may be kept which indicate which proxy was used by the crawler 60 to access a particular target network presence and at what time. Future monitoring operations by the crawler 60 can then assure that the same proxy is not used to access the same network presence the second time. The searching behavior of all the proxies may be coordinated by a central process to assure, for example, that different proxies do not search links or files that have already been searched by another proxy of the crawler 60.

As an example of coordination between proxies, if the crawler 60 searching through a first proxy locates a string media file on a network presence, the first proxy may choose, instead of playing the stream, to instead send a coordination record or create a reference record that identifies the streaming media file and its URL. The crawler 60 could later access the network presence using a second proxy to download and analyze the file at that URL. When the crawler 60 returns using the second proxy to download the streaming file, the second proxy may navigate through the site in a way they would mimic a human user accessing the target movie file. Typically, for example a human user would first go to the home page of the target network presence and navigate through a succession of web pages to the URL of the file. The file could then be downloaded and analyzed by the crawler 60 using the second proxy.

It should be appreciated from the description of the use of the media tracking system for discovering and reporting instances of tracked media files on the Internet that the media tracking system can be adapted for a wide range of uses in a wide range of environments. The media tracking system can be adapted to be used, for example, to ascertain whether or not unauthorized copies of copyrighted media files are resident on a particular computer system that has a system administer or system owner, the system can be used to determine the number of copies and the locations of particular media files on a network such is the Internet (to determine, for example, the market penetration of a particular media file) or to generally catalog a number of unknown media files for later searches.

More particularly, system operators and/or system owners (referred to hereafter as "private system operators"), for example, may wish to know whether or not unauthorized copies of tracked media are resident on their systems (hereafter referred to as "private" systems). In this situation, the private computer system may not be connected to the Internet, the system may be accessible through the Internet but password or firewall protected to prevent access to the private system by unauthorized users (including web crawlers) and so on. Private system operators may wish to ascertain whether or not unauthorized copies of tracked media files are resident on their private systems. The media tracking system may be adapted to be used by private system operators to track media dissemination on their systems. For example, it should be understood that media tracking system service providers operating in accordance with at least one embodiment of the invention may provide private system operators with a set of software tools for: a) searching a collection of machine readable data resident on an individual computer system or a private network to locate the unknown media files therein; 2) generating a media file identifier for each unknown media file located in the collection of machine readable data; 3) determining an address of the unknown media file in the collection of machine readable data; 4) storing the media file identifier for the unknown media file in a database; 5) storing the address of the unknown media file in a database; and 6) associating the stored address of the unknown media file with the stored media file identifier for the unknown media file. The private system operator may then check the media file identifiers generated from the media files on the private system against a database of tracked media file identifier is maintained by the media tracking system service provider.

Alternatively, the service provider could provide the identifiers of the tracked media files to the private system operator for storage and use on the private system operators system. The identifiers of currently protected files could be provided by the media tracking system service provider to the private system operator on a subscription basis.

If the private system operator finds a match between the media file identifier generated from the unknown media file resident on his system and a tracked media file identifier provided by the service provider, the private system operator could use the location data that is associated with the identifier for the unknown media file resident on his system to locate the tracked media file for removal from the system or for other appropriate action.

The media tracking system can be adapted to catalog a collection of unknown media files on a private network or on a public network such as the Internet. When the media tracking system is used to catalog media files on the Internet, for example, the system may search for unknown media files, generate and store a media file identifier for each unknown media file located, determine and store the address of each unknown media file and associate the address of the unknown media file with the stored media file identifier therefor. The unknown media files could then be identified by, for example, comparing the unknown media file identifiers against a database of known media file identifiers. If the system finds a match between an unknown media file identifier and a known media file identifier, the system could associate the identifying data for method data of the known media file with the unknown media file to identify the latter. Alternatively, or additionally, if no metadata is provided for the unknown media file identifiers, the database of unknown media file identifiers could still be queried to find a match for a query media file. In this instance, if an individual is looking for a particular media file (hereafter called the "query media file"), the individual would present the query media file to the media tracking system and the media tracking system would generate a query media file identifier for the query media file. The media tracking system within check the database of unknown media file identifiers for a match with the query media file identifier. If the tracking system finds the match, the system could then locate and retrieve the matching media files in the collection of data catalog by the system.

The media tracking system can be used in the Internet environment, for example, to determine the number and locations of particular media files. This is important in many applications such as, for example, determining the market penetration of the particular commercial media file. This function will be generally referred to hereafter as "determining distribution" of any file. The system can determine the distribution of a file on the Internet by calling the Internet to locate media files, generating media file identifiers over the discovered files, storing the occurrence of media file identifier in a database with associated address information than querying the database to determine the number of occurrences of a particular media file identifier and to determine the distribution of sites (or network addresses) on which particular media files are resident.

It should be appreciated that the objectives of the present invention have been fully and effectively accomplished. It is to be understood, however, that the foregoing embodiments and examples has been provided solely to illustrate the principles of the present invention and is not intended to be limit the scope of the invention. To the contrary, the present invention is intended to encompass all the modifications, alterations, and substitutions within the spirit and scope of the appended claims.

Further, it should be appreciated that use of the term Internet Protocol or IP protocol is meant to be illustrative. Therefore, as the invention has been described herein, it should be understood that the invention may be implemented with various peer to peer protocols and not limited to IP.

What is claimed is:

1. A method for identifying a media file, the method comprising:
   generating a media file identifier for a known media file;
   searching a network based on exclusion information to locate an unknown media file therein;
   generating a media file identifier for the unknown media file located based on the search, wherein the media file identifier is generated for the located unknown media file using an up-down coding algorithm for audio data in the located unknown media file; and
   comparing the media file identifier for the known media file with the media file identifier for unknown media file in order to determine if the respective media files from which the known media file identifier and the unknown media file identifier were generated have sufficiently similar media content.

2. The method of claim 1, wherein generating the media file identifier for a known media file, further comprises enabling a customer to generate the media file identifier.

3. The method of claim 2, wherein the network includes the Internet.

4. The method of claim 3, wherein the searching is accomplished by a crawler.

5. The method of claim 4, wherein the crawler is capable of searching a network site based on an address for the network site provided by an administrator.

6. The method of claim 4, wherein the crawler is further capable of analyzing machine readable data residing on the network to generate an address of another network to be searched.

7. The method of claim 1, wherein the generating of the media file identifier for the unknown media file further comprises downloading the unknown media file and then analyzing the unknown media file with an identifier generating algorithm.

8. The method of claim 1 wherein the unknown media file is a streaming media file and wherein the generating of the media file identifier for the unknown media file utilizing the identifier generating algorithm is accomplished by playing the unknown media file as a stream of data and analyzing the stream of media data with the identifier generating algorithm as the stream is received by the crawler.

9. The method of claim 1, wherein a word count algorithm is used to generate the media file identifier for video data in the unknown media file and to generate the media file identifier for video data in the known media file.

10. The method of claim 1, further comprising providing an address of the unknown media file in response to a determination that the known media file identifier and the unknown media file identifier were generated from media files having sufficiently similar media content.

11. A method for identifying a media file as defined in claim 10, further comprising providing metadata that includes information sufficient to identify the unknown media file, storing the metadata in a database and associating the metadata with the unknown media file.

12. A method for identifying a media file as defined in claim 1, wherein the generating of the media file identifier for the unknown media file is accomplished by analyzing the unknown media file with an identifier generating algorithm and wherein the providing a media file identifier for the known media file is accomplished by analyzing the known media file with the identifier generating algorithm.

13. The method of claim 12, wherein the unknown media file further includes video data and wherein the identifier generating algorithm is a word count algorithm for the video data.

14. A method for identifying a media file as defined in claim 1, further comprising providing metadata that includes information sufficient to identify the known media file, storing the metadata in a database and associating the metadata with the known media file.

15. A method for identifying a media file as defined in claim 14, wherein the searching is accomplished by a crawler.

16. A method for identifying a media file as defined in claim 15, wherein the crawler is capable of searching a network site based on an address for the network site provided by an administrator.

17. A method for identifying a media file as defined in claim 16, wherein the crawler is further capable of analyzing the machine readable data residing on the network site to generate an address of another network site to be searched.

18. A method for identifying a media file as defined in claim 17, wherein the generating of the media file identifier for the unknown media file utilizing the identifier generating algorithm is accomplished by downloading the unknown media file and then analyzing the unknown media file with the identifier generating algorithm.

19. A method for identifying a media file as defined in claim 17, wherein the unknown media file is a streaming media file and wherein the generating of the media file identifier for the unknown media file utilizing the identifier generating algorithm is accomplished by playing the unknown media file as a stream and analyzing the stream of media data with the identifier generating algorithm as the stream is received by the crawler.

20. The method of claim 17, wherein the crawler is implemented by a plurality of computers distributed throughout the network and wherein the searching is accomplished by the plurality of computers searching the network simultaneously.

21. A method for identifying a media file as defined in claim 20, wherein the crawler controls the plurality of computers so as to mimic the behavior of a human user searching the network site.

22. A method for identifying a media file as defined in claim 7, wherein the unknown media file further comprises video data and wherein the identifier generating algorithm is a warp algorithm.

23. A method for identifying a media file, the method comprising:
enabling a customer to generate a media file identifier for a known media file;
storing the media file identifier for the known media file in a database;
searching, using a crawler, a collection of machine readable data residing on a computer network that includes the Internet based on exclusion information to locate an unknown media file therein, wherein the unknown media file is an audio file, wherein the crawler is capable of searching a network site based on an address for the network site provided by an administrator, and is further capable of analyzing the machine readable data residing on the network site to generate an address of another network site to be searched;
generating a media file identifier for the unknown media file located in the collection of machine readable data by downloading the unknown media file and then analyzing the unknown media file with an identifier generating algorithm, and wherein the identifier generating algorithm is an up-down coding algorithm;
determining an address of the unknown media file in the collection of machine readable data;
storing the media file identifier for the unknown media file in the database;
storing the address of the unknown media file in the database;
associating the stored address of the unknown media file with the stored media file identifier for the unknown media file; and
comparing the media file identifier for the known media file with the media file identifier for unknown media file in order to determine if the respective media files from which the known media file identifier and the unknown media file identifier were generated have sufficiently similar media content.

24. A method for identifying a media file the method comprising:
enabling a customer to generate a media file identifier for a known media file;
storing the media file identifier for the known media file in a database;
searching a collection of machine readable data based on exclusion information to locate an unknown media file therein, the unknown media files is an audio file;

generating a media file identifier for the unknown media file located in the collection of machine readable data, by analyzing the unknown media file with an up-down coding identifier generating algorithm and wherein the providing a media file identifier for the known media file is accomplished by analyzing the known media file with the identifier generating algorithm;

determining an address of the unknown media file in the collection of machine readable data;

storing the media file identifier for the unknown media file in the database;

storing the address of the unknown media file in the database;

associating the stored address of the unknown media file with the stored media file identifier for the unknown media file; and comparing the media file identifier for the known media file with the media file identifier for unknown media file in order to determine if the respective media files from which the known media file identifier and the unknown media file identifier were generated have sufficiently similar media content.

25. A method for identifying a media file resident on a network, the method comprising:

creating a media file identifier by analyzing a known media file using an identifier generating algorithm selected by a customer;

storing the known media file identifier in a database;

creating a media file identifier for an unknown media file with the identifier generating algorithm, wherein the unknown media file is determined based, in part, on exclusion information, and wherein the identifier generating algorithm is an up-down algorithm for audio data in the unknown media file; and comparing the media file identifier for the unknown media file with the known media file identifier in order to determine if the respective media files from which the unknown media file identifier and the known media file identifier were generated include identical media content.

26. The method of claim 25, further comprising:

storing in the database metadata for the known media file, the metadata providing information sufficient to identify the known media file for which it is stored;

associating the metadata for the known media file with the known media file identifier so that the identity of the unknown media file can be determined in the event that unknown media file and the known media file are determined to have been generated from media files having identical media content.

27. The method of claim 26, wherein:

the unknown media file and the known media file further comprise video data;

each media file contains computer readable code encoding a series of images; the images in each series in each media file are encoded as a plurality of words;

the creating the known media file identifier comprises counting the words used to encode selected images of the known video file;

the creating a media file identifier for the unknown media file comprises counting the words used to encode selected images thereof; and the comparing comprises comparing the number of words used to encode the selected images of the known media file with the number of words used to encode the selected images of the unknown media file.

28. The method of claim 27, wherein the images in each the series of images are encoded as a GOP.

29. The method of claim 27, wherein the creating a media file identifier for an unknown media file comprises sequentially generating word counts for selected successive images in the unknown media file, and the comparing comprises comparing the word counts of images of the unknown media file as they are generated with the word counts of corresponding images of the known media files; and terminating the generating and the comparing if a sufficiently close match is found, or when the word count of each unknown image in the sequence of unknown images has been compared.

30. A method for identifying a media file resident on a network, the method comprising:

creating a media file identifier by analyzing a known media file using an identifier generating algorithm selected by a customer wherein the content of the known media file is an audio file that includes an encoded audio signal, and the identifier generating algorithm is an up-down coding algorithm;

storing the known media file identifier in a database;

creating a media file identifier for an unknown media file with the identifier generating algorithm, wherein the unknown media file is determined based, in part, on exclusion information;

storing in the database metadata for the known media file, the metadata providing information sufficient to identify the known media file for which it is stored;

associating the metadata for the known media file with the known media file identifier so that the identity of the unknown media file can be determined in the event that unknown media file and the known media file are determined to have been generated from media files having identical media content; and comparing the media file identifier for the unknown media file with the known media file identifier in order to determine if the respective media files from which the unknown media file identifier and the known media file identifier were generated include identical media content.

31. The method of claim 30 wherein the up-down coding algorithm is used on the entire audio file.

32. The method of claim 30 wherein the up-down coding algorithm is used on only a portion of the audio file.

33. The method of claim 30 wherein the network is the Internet and further comprising accessing the unknown media file via the Internet.

34. The method of claim 33 wherein the accessing is performed in a coordinated manner by a crawler from a plurality of web addresses.

35. An apparatus for identifying a media file residing on a network the apparatus comprising:

at least one module configured to create a plurality of known media file identifiers, each for a respective one of a plurality of known media files, using an identifier generating algorithm selected by a customer, the identifier generating algorithm being an up-down algorithm for audio data in the known media files;

a database configured to store the known media file identifiers;

at least one module configured to create a media file identifier for an unknown media file with the identifier generating algorithm, wherein the unknown media file is selected employing exclusion information, the identifier generating algorithm being the up-down algorithm for audio data in the unknown media files; and at least one module configured to compare the media file identifier for the unknown media file with known media file identifiers to determine if the respective media files from which the known media file identifier and the unknown media file identifier were generated have identical media content.

36. An apparatus as defined in claim 35, wherein the database is also configured to store metadata for each known media file in association with the corresponding known media file and known media file identifier located in the database.

37. The apparatus of claim 36, wherein the unknown media file and each known media file further comprise video data, each media file including computer readable code encoding a series of images including a plurality of words; wherein the apparatus further includes at least one module configured to create known media file identifiers by counting the words used to encode selected images of each known media file that further comprises video data, wherein the apparatus further includes at least one module configured to create a media file identifier for an unknown media file by counting the words used to encode selected images thereof, and wherein the at least one module for comparing is configured to compare the number of words used to encode selected images of each known media file with the number of words used to encode selected images of the unknown media file.

38. An apparatus as defined in claim 37, wherein the images in each the series of images are encoded as a GOP.

39. An apparatus as defined in claim 37, wherein the at least one module configured to create the media file identifier for the unknown media file includes at least one module for sequentially generating word counts for successive images in the unknown media file, wherein the at least one module configured to create media file identifiers for a known media file includes at least one module configured to generate word counts for successive images in each known media file and the at least one module configured to compare includes at least one module configured to compare each unknown image identifier to corresponding image identifiers for the known media files as they are generated, and wherein the apparatus further includes at least one module configured to terminate the at least one module configured to generate and the at least one module configured to compare when at least one sufficiently close match is found, or when each unknown image identifier in the sequence of unknown image identifiers has been compared.

40. An apparatus for identifying a media file residing on a network the apparatus comprising:

at least one module configured to create a plurality of known media file identifiers, each for a respective one of a plurality of known media files, using an identifier generating algorithm selected by a customer;

a database configured to store the known media file identifiers and to further store metadata for each known media file in association with the corresponding known media file and known media file identifier located in the database;

at least one module configured to create a media file identifier for an unknown media file with the identifier generating algorithm, wherein the unknown media file is selected employing exclusion information, and wherein the unknown media file and each known media file is an audio file and the content of each audio file includes an audio signal, and the identifier generating algorithm is an up-down coding algorithm; and at least one module configured to compare the media file identifier for the unknown media file with known media file identifiers to determine if the respective media files from which the known media file identifier and the unknown media file identifier were generated have identical media content.

41. An apparatus as defined in claim 40 wherein the up-down coding algorithm is used on the entire audio file.

42. An apparatus as defined in claim 40 wherein the up-down coding algorithm is used on only a portion of the audio file.

43. An apparatus as defined in claim 40 wherein the network is the Internet and further comprising accessing the unknown media file via the Internet.

44. An apparatus as defined in claim 43 wherein the means for accessing the Internet comprises at least one module configured to access the Internet in a coordinated manner from a plurality of web addresses.

45. A method for identifying a media file resident on a network, the method comprising:

creating a media file identifier by analyzing a known media file using an up-down coding identifier generating algorithm;

storing the known media file identifier in a database;

creating a media file identifier for an unknown media file with the selected identifier generating algorithm, wherein the unknown media file is determined based, in part, on exclusion information; and comparing the media file identifier for the unknown media file with the known media file identifier in order to determine if the respective media files from which the unknown media file identifier and the known media file identifier were generated include sufficiently similar media content.

46. The method of claim 45, wherein creating the media file identifier further comprises analyzing the known media file using at least one other identifier generating algorithm that is selectable by a customer from a plurality of standalone identifier generating algorithms consisting of a word count algorithm and a warp algorithm.

* * * * *

UNITED STATES PATENT AND TRADEMARK OFFICE
CERTIFICATE OF CORRECTION

PATENT NO. : 7,043,473 B1
APPLICATION NO. : 09/988824
DATED : May 9, 2006
INVENTOR(S) : Reza P. Rassool et al.

It is certified that error appears in the above-identified patent and that said Letters Patent is hereby corrected as shown below:

First Page Col. 2 (Foreign Patent Documents), Line 1, After "658054" delete "BA" and insert -- B1 --.

First Page Col. 2 (Attorney, Agent or Firm), Line 2, After "Darby" insert -- P.C. --.

Page 2 Col. 1 (U.S. Patent Documents), Line 40, After "6,314,409" delete "B1" and insert -- B2 --.

Page 2 Col. 1 (U.S. Patent Documents), Line 48 After "6,409,080" delete "B1" and insert -- B2 --.

Page 2 Col. 1 (U.S. Patent Documents), Line 58 Delete "1/2003" and insert -- 9/2003 --.

Page 2 Col. 2 (U.S. Patent Documents), Line 1, After "6,634,028" delete "B1" and insert -- B2 --.

Page 2 Col. 2 (U.S. Patent Documents), Line 6, After "6,654,423" delete "B1" and insert -- B2 --.

Page 2 Col. 2 (Other Publications), Line 1, Delete ".htm," and insert -- .html, --.

Page 2 Col. 2 (Other Publications), Line 13, Delete "chapter" and insert -- chapters --.

Page 2 Col. 2 (Other Publications), Delete "Immage" and insert -- Image --.

Column 2, Line 11, Delete "Nework" and insert -- Network --.

Column 3, Line 52, Delete "the" before "those".

UNITED STATES PATENT AND TRADEMARK OFFICE
CERTIFICATE OF CORRECTION

PATENT NO. : 7,043,473 B1
APPLICATION NO. : 09/988824
DATED : May 9, 2006
INVENTOR(S) : Reza P. Rassool et al.

It is certified that error appears in the above-identified patent and that said Letters Patent is hereby corrected as shown below:

Column 12, Line 66, Delete "center of gravity" and insert -- center-of-gravity.

Column 12, Line 67, Delete "$p_{\{\infty\}}^{CG}$," and insert -- $p_{\{\infty\}}^{CG}$, --.

Column 13, Line 16, Delete "center of gravity" and insert -- center-of-gravity--.

Column 18, Line 3, Delete "center of gravity" and insert -- center-of-gravity--.

Column 38, Line 59, In Claim 24, after "file" insert -- , --.

Signed and Sealed this

Fifteenth Day of August, 2006

JON W. DUDAS
*Director of the United States Patent and Trademark Office*